US009642052B2

(12) United States Patent
Narita

(10) Patent No.: US 9,642,052 B2
(45) Date of Patent: May 2, 2017

(54) WIRELESS COMMUNICATION DEVICE, WIRELESS COMMUNICATION SYSTEM, AND HAND OVER CONTROL METHOD

(71) Applicant: FUJITSU LIMITED, Kawasaki-shi, Kanagawa (JP)

(72) Inventor: Tsubasa Narita, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/049,553

(22) Filed: Feb. 22, 2016

(65) Prior Publication Data

US 2016/0255550 A1    Sep. 1, 2016

(30) Foreign Application Priority Data

Feb. 26, 2015 (JP) ................... 2015-036106

(51) Int. Cl.
*H04W 36/00* (2009.01)
*H04W 36/36* (2009.01)

(52) U.S. Cl.
CPC ....... *H04W 36/0094* (2013.01); *H04W 36/36* (2013.01)

(58) Field of Classification Search
CPC .............. H04W 36/00; H04W 36/0005; H04W 36/0016; H04W 36/0055; H04W 36/0061; H04W 36/0083; H04W 36/0088; H04W 36/0094; H04W 36/04; H04W 36/042; H04W 36/14; H04W 36/18; H04W 36/30; H04W 36/36; H04W 36/38; H04W 72/042; H04B 17/318; H04B 17/18541
(Continued)

(56) References Cited

U.S. PATENT DOCUMENTS 5,898,926 A    4/1999 Konishi
6,044,272 A *  3/2000 Kobylinski ........... H04W 36/26
                                                370/331
(Continued)

FOREIGN PATENT DOCUMENTS

JP    9-284826      10/1997
JP    2004-201001    7/2004
JP    2010-212988    9/2010

OTHER PUBLICATIONS

"Intra-LTE Handover Using the X2 Interface", Dec. 4, 2013, http://www.3glteinfo.com/intra-lte-handover-using-x2-interface/, 9 pages.

*Primary Examiner* — Quochien B Vuong
(74) *Attorney, Agent, or Firm* — Staas & Halsey LLP

(57) ABSTRACT

An apparatus calculates a first radio wave strength value, based on a first radio wave between a wireless communication device and a first base station device wirelessly coupled to the wireless communication device, calculates a second radio wave strength value, based on a second radio wave between the wireless communication device and a second base station device, changes at least one of the first radio wave strength value and the second radio wave strength value, when a first wireless communication method used by the first base station device is different from a second wireless communication method used by the second base station device, and, after changing at least one of the first radio wave strength value and the second radio wave strength value, transmits, to the first base station device, a measurement report including the first and second radio wave strength values.

20 Claims, 18 Drawing Sheets

(58) Field of Classification Search
USPC .............. 455/67.11, 436, 437, 552.1, 553.1;
370/328, 331, 332
See application file for complete search history.

(56) References Cited

U.S. PATENT DOCUMENTS

| | | | | |
|---|---|---|---|---|
| 6,400,951 | B1* | 6/2002 | Vaara | H04W 48/16 |
| | | | | 455/436 |
| 6,978,120 | B1* | 12/2005 | Melero | H04W 48/16 |
| | | | | 455/437 |
| 7,307,969 | B2* | 12/2007 | Shin | H04W 36/30 |
| | | | | 370/331 |
| 7,546,124 | B1* | 6/2009 | Tenneti | H04W 92/02 |
| | | | | 455/436 |
| 7,860,502 | B2* | 12/2010 | Kim | H04B 1/7105 |
| | | | | 370/310 |
| 8,306,538 | B2* | 11/2012 | Lee | H04W 24/10 |
| | | | | 455/436 |
| 2005/0037756 | A1 | 2/2005 | Yaguchi et al. | |
| 2013/0021929 | A1* | 1/2013 | Kim | H04B 7/024 |
| | | | | 370/332 |

\* cited by examiner

FIG. 4A

| BASE STATION | LTE_A | LTE_B | 3G_A |
|---|---|---|---|
| LONGITUDE AND LATITUDE | (I1,J1) | (I2,J2) | (I3,J3) |
| COMMUNICATION TYPE | LTE | LTE | 3G |

| TIME | T1 | T2 | T3 | T4 | ... |
|---|---|---|---|---|---|
| LONGITUDE AND LATITUDE | (X1,Y1) | (X2,Y2) | (X3,Y3) | (X4,Y4) | ... |

| BASE STATION | LTE_A | LTE_B | 3G_A |
|---|---|---|---|
| RADIO WAVE STRENGTH | xx[dB] | yy[dB] | zz[dB] |

| | LTE_A | LTE_B | 3G_C |
|---|---|---|---|
| SPOT X1 | -60[dB] | 0[dB] | -65[dB] |
| SPOT Y1 | -35[dB] | -45[dB] | -70[dB] |

123a

| | LTE_A | LTE_B | 3G_C |
|---|---|---|---|
| SPOT X1 | -60[dB] | 0[dB] | -20[dB] |
| SPOT Y1 | -35[dB] | -45[dB] | -25[dB] |

| | LTE_A | LTE_B | 3G_C |
|---|---|---|---|
| SPOT X2 | -90[dB] | 0[dB] | -20[dB] |
| SPOT Y2 | -5[dB] | 0[dB] | -70[dB] |

123

WIRELESS COMMUNICATION DEVICE, WIRELESS COMMUNICATION SYSTEM, AND HAND OVER CONTROL METHOD

CROSS-REFERENCE TO RELATED APPLICATION

This application is based upon and claims the benefit of priority of the prior Japanese Patent Application No. 2015-036106, filed on Feb. 26, 2015, the entire contents of which are incorporated herein by reference.

FIELD

The embodiments discussed herein are related to a wireless communication device, a wireless communication system, and a hand over control method.

BACKGROUND

Currently, wireless communication systems such as a mobile phone system and a wireless local area network (LAN) are widely used. In addition, in the field of wireless communication, in order to further improve a communication speed and a communication capacity, a next-generation communication technology is continuously discussed. In, for example, 3rd Generation Partnership Project (3GPP) serving as a standardization body, standardization of a communication standard called Long Term Evolution (LTE) and standardization of a communication standard called LTE-Advanced (LTE-A) based on LTE are completed or studied.

In such wireless communication systems, a technology called hand over is used in some cases. The hand over is, for example, a technology for switching a base station device, to which a terminal device is coupled, from a base station device to another base station device. Based on the hand over, the terminal device becomes able to continuously perform wireless communication.

In LTE, a base station device transmits a MEASUREMENT CONTROL REQ message to a terminal device in some cases. The MEASUREMENT CONTROL REQ message includes a threshold value and so forth. In a case of obtaining a detection result greater than or equal to the threshold value, the terminal device that receives the relevant message transmits a MEASUREMENT REPORT message to the base station device. Based on, for example, the MEASUREMENT REPORT message, the base station device determines whether or not to perform hand over.

As a technology relating to the hand over, there are, for example, the following technologies.

In other words, there is a channel switching method for determining, based on the degree of reduction of an electric field strength of a channel during communication, whether a terminal is in high-speed movement or in low-speed movement and performing channel switching, in a case of being in the high-speed movement, by selecting a wireless base station whose electric field strength is greater than or equal to a specified value and that has a maximum increasing change in the electric field strength.

According to this technology, it is thought that it is possible to reliably perform channel switching even if, for example, a simplified mobile phone terminal moves at high speed and it is possible to reduce instantaneous interruptions during a telephone call by suppressing as much as possible of the number of times channel switching is performed.

In addition, there is a mobile communication system in which the location of a mobile station after an arbitrary time period is predicted based on a distance from a base station and the movement direction and the movement velocity of the mobile station, thereby handing over to a base station whose distance from the predicted location is the shortest and that is predicted to improve downlink communication quality.

According to this technology, it is thought that it is possible to reduce the power consumption of a wireless mobile station by suppressing, for example, the number of times undesirable hand over is controlled and it is possible to maintain stable communication by reducing a load on an entire wireless system.

Furthermore, there is a wireless base station system in which, using a control device, path information is created based on the history of previous telephone calls, a wireless base station able to be skipped is identified based on the path information, and hand over performed on the identified wireless base station is avoided.

According to this technology, it is possible to reduce undesirable hand over while not adding, for example, a function to a wireless mobile station. As technical literatures of the related art, there are "Intra-LTE Handover Using the X2 interface", 3gLterInfo, Dec. 4, 2013, Japanese Laid-open Patent Publication No. 9-284826, Japanese Laid-open Patent Publication No. 2004-201001, and Japanese Laid-open Patent Publication No. 2010-212988.

SUMMARY

According to an aspect of the invention, a wireless communication device includes a memory and a processor coupled to the memory, the processor being configured to calculate a first radio wave strength value, based on a first radio wave between the wireless communication device and a first base station device wirelessly coupled to the wireless communication device, calculate a second radio wave strength value, based on a second radio wave between the wireless communication device and a second base station device, change at least one of the first radio wave strength value and the second radio wave strength value, when a first wireless communication method used by the first base station device is different from a second wireless communication method used by the second base station device, and, after changing at least one of the first radio wave strength value and the second radio wave strength value, transmit, to the first base station device, a measurement report including the first radio wave strength value and the second radio wave strength value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of a base station location information table, FIG. 4B is a diagram illustrating an example of a self-location coordinate history information table, and FIG. 4C is a diagram illustrating an example of a radio wave strength table;

FIG. 15 is a diagram individually illustrating an example of a radio wave strength table and an example of a radio wave strength table after a change;

FIG. 17 is a diagram illustrating an example of a radio wave strength table.

DESCRIPTION OF EMBODIMENTS

In a case where wireless communication methods of a base station serving as a hand over source and a base station serving as a hand over destination are different from each other, a terminal device performs processing for switching a wireless communication method, and compared with a case where wireless communication methods before and after hand over are equal to each other, it takes time to perform hand over in some cases. In this case, in the terminal device, compared with a case where the wireless communication methods before and after the hand over are equal to each other, it takes time to transmit and receive data, and a transmission delay occurs in some cases.

In addition, compared with a case where the wireless communication methods before and after the hand over are equal to each other, owing to the occurrence of the transmission delay, a user who uses the terminal device feels lowering of sense of using (alternatively, called "usability" in some cases) in some cases.

In the technology for selecting, during high-speed movement, a wireless base station whose electric field strength is greater than or equal to a specified value and that has a maximum increasing change in an electric field strength, a difference between wireless communication methods before and after switching of a wireless base station is not taken into consideration. Accordingly, even in a case where the wireless base station whose electric field strength is greater than or equal to the specified value and that has a maximum increasing change in an electric field strength, if wireless communication methods of wireless base stations before and after the selection are different from each other, a transmission delay occurs in some cases.

In addition, in the technology for handing over to a base station whose distance from the predicted location is the shortest and that is predicted to improve downlink communication quality and the technology for identifying, based on the path information, a wireless base station able to be skipped, a difference between wireless communication methods of wireless base stations before and after the hand over is not taken into consideration. Accordingly, as for the two technologies, a transmission delay occurs in some cases.

(First Embodiment)

Figure 1:
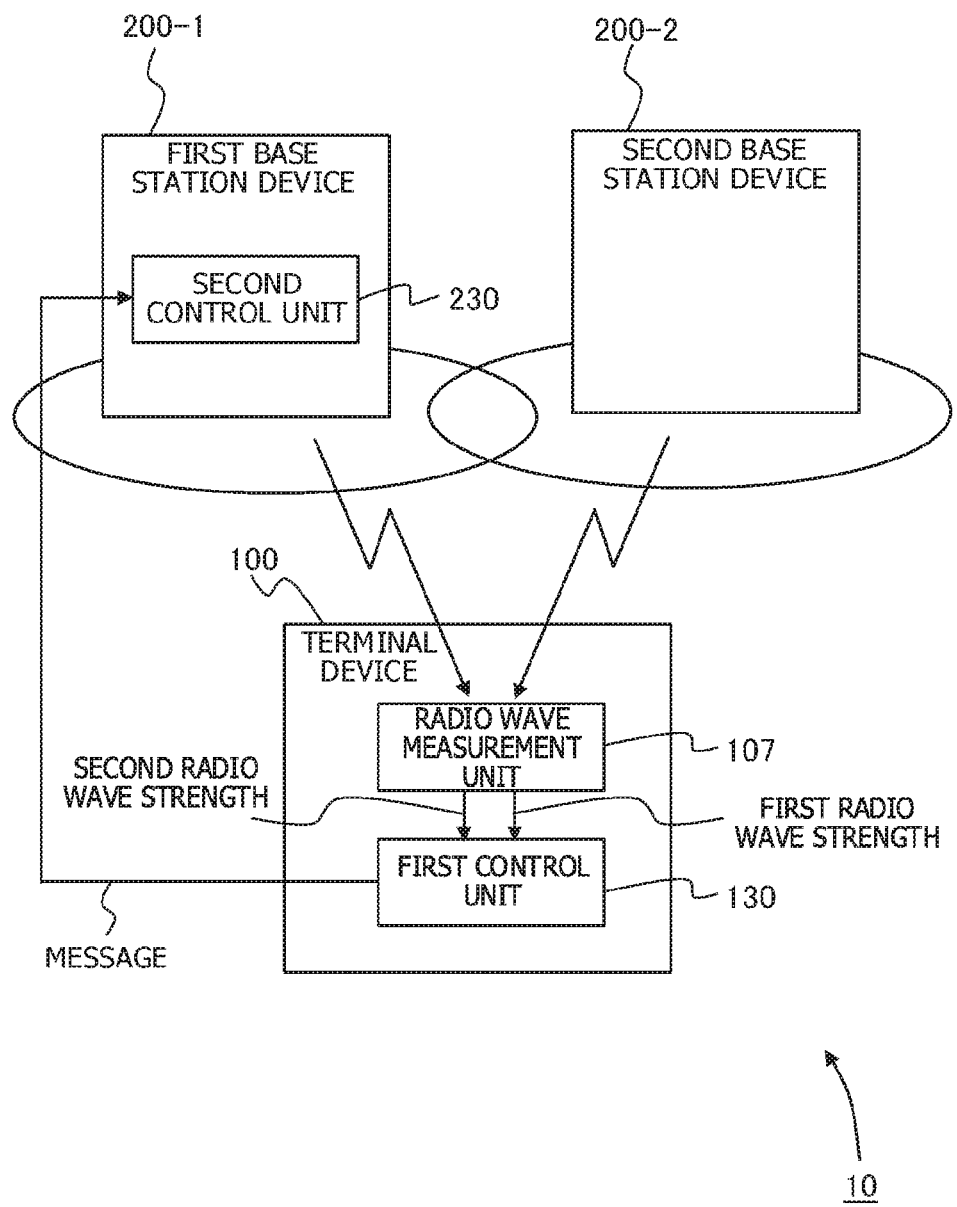
FIG. 1 is a diagram illustrating an example of a configuration of a wireless communication system.

A first embodiment will be described. FIG. 1 illustrates an example of a configuration of a wireless communication system 10 in the first embodiment. The wireless communication system 10 includes a terminal device 100 and first and second base station devices 200-1 and 200-2.

The terminal device 100 is a wireless communication device that wirelessly communicates with the first base station device 200-1 in a service provision range of the first base station device 200-1. Examples of the terminal device 100 include a feature phone, a smartphone, a personal computer, and a game device. In the example of FIG. 1, the terminal device 100 is wirelessly coupled to the first base station device 200-1 and wirelessly communicates with the first base station device 200-1.

The first base station device 200-1 is a wireless communication device that wirelessly communicates with the terminal device 100 in the service provision range of the station itself. The first base station device 200-1 is able to provide, to the terminal device 100, various services such as a call service and a Web browsing service.

The second base station device 200-2 is a wireless communication device that wirelessly communicates with the terminal device 100 in a service provision range of the station itself, and the second base station device 200-2 is able to provide, to the terminal device 100, various services such as a call service. The service provision range of the second base station device 200-2 overlaps with the service provision range of the first base station device 200-1.

The terminal device 100 includes a radio wave measurement unit 107 and a first control unit 130. In addition, the first base station device 200-1 includes a second control unit 230.

The radio wave measurement unit 107 measures a first radio wave strength for the first base station device 200-1. In addition, the radio wave measurement unit 107 measures a second radio wave strength for the second base station device 200-2. The radio wave measurement unit 107 outputs the measured first and second radio wave strengths to the first control unit 130.

Based on wireless communication methods used in the first and second base station devices 200-1 and 200-2, the first control unit 130 changes the first and second radio wave strengths measured in the radio wave measurement unit 107. In addition, the first control unit 130 generates a message including the changed first or second radio wave strength and transmits the generated message to the first base station device 200-1.

The second control unit 230 receives the message transmitted by the terminal device 100. In addition, based on the received message, the second control unit 230 judges whether or not to wirelessly couple the terminal device 100 to the second base station device 200-2 by switching wirelessly coupling.

In this way, in the preset first embodiment, the first or second radio wave strength is changed based on the wireless communication methods used in the first and second base station devices 200-1 and 200-2.

In a case where, for example, the wireless communication methods of the second base station device 200-2 and the first base station device 200-1 are equal to each other, the terminal device 100 is able to change the second radio wave strength to a value stronger than the first radio wave strength (alternatively, is able to change the first radio wave strength to a value weaker than the second radio wave strength). From this, since, in, for example, the first base station device 200-1, the second radio wave strength is stronger than the first radio wave strength, it is possible to hand over the terminal device 100 to the second base station device 200-2. In this case, at the time of being handed over to the second base station device 200-2, the terminal device 100 does not change a wireless communication method. Accordingly, in this case, at the time of the hand over, it is possible for the terminal device 100 to suppress a transmission delay associated with changing of a wireless communication method.

In addition, in a case where, for example, the wireless communication methods of the second base station device 200-2 and the first base station device 200-1 are different from each other, the terminal device 100 is able to change the first radio wave strength to a value stronger than the second radio wave strength (alternatively, is able to change the second radio wave strength to a value weaker than the first radio wave strength). From this, since, in, for example, the first base station device 200-1, the first radio wave strength is stronger than the second radio wave strength, it is possible to maintain wireless coupling to the first base station device 200-1 while not handing over the terminal device 100 to the second base station device 200-2. Accordingly, in this case where, the terminal device 100 itself is inhibited from being handed over to the second base station device 200-2, and it is possible for the terminal device 100 to achieve the reduction of the number of times hand over is performed. If the number of times hand over is performed is reduced, it is possible for the terminal device 100 to achieve the reduction of power consumption due to the hand over.

(Second Embodiment)

A second embodiment will be described.

(Example of Configuration of Wireless Communication System)

Figure 2:
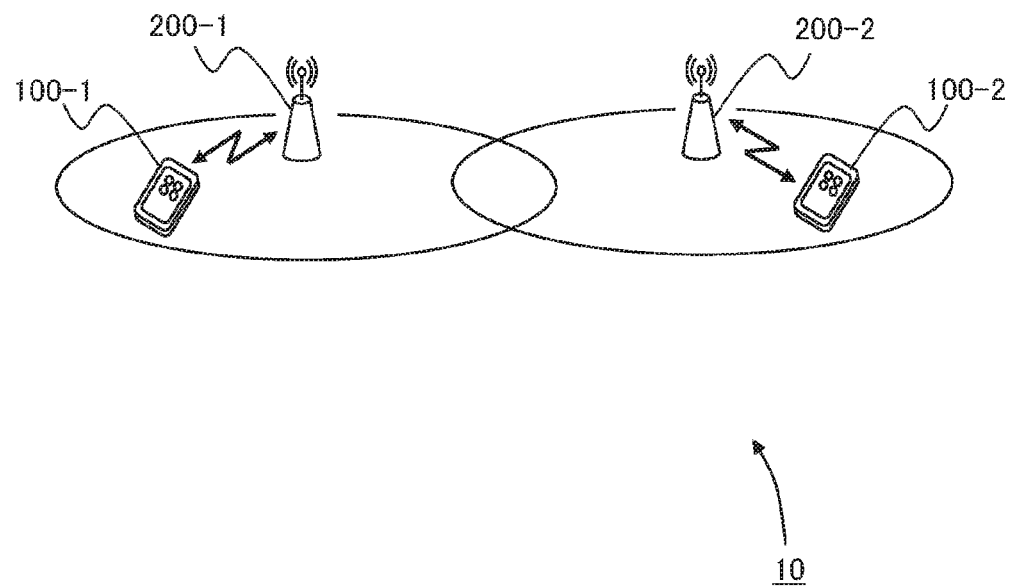
FIG. 2 is a diagram illustrating an example of a configuration of the wireless communication system.

An example of a configuration of a wireless communication system will be described. FIG. 2 is a diagram illustrating an example of a configuration of the wireless communication system 10 in the present second embodiment.

The wireless communication system 10 includes terminal devices (hereinafter called "terminals" in some cases) 100-1 and 100-2 and base station devices (hereinafter called "base stations" in some cases) 200-1 and 200-2.

Each of the terminals 100-1 and 100-2 is a wireless communication device such as, for example, a feature phone, a smartphone, a personal computer, or a game device. By wirelessly communicating with the base stations 200-1 and 200-2, the terminals 100-1 and 100-2 are able to be provided with various services such as a call service, a Web browsing service, and a video distribution service by the base stations 200-1 and 200-2, respectively.

The base stations 200-1 and 200-2 are wireless communication devices that wirelessly communicate with the terminals 100-1 and 100-2 in the respective service provision ranges of the stations themselves. At the time of wirelessly communicating with the terminals 100-1 and 100-2, the base stations 200-1 and 200-2 perform, on the terminals 100-1 and 100-2, respectively, scheduling such as allocation of wireless resources. Scheduling results are transmitted, as control signals, to the terminals 100-1 and 100-2 by the base stations 200-1 and 200-2, respectively. In accordance with the scheduling results, the terminals 100-1 and 100-2 wirelessly communicate with the base stations 200-1 and 200-2, respectively.

In addition, the base stations 200-1 and 200-2 transmit MEASUREMENT CONTROL REQ messages to the terminals 100-1 and 100-2, respectively. Each of the MEASUREMENT CONTROL REQ messages includes, for example, a parameter and a threshold value, used for measuring a radio wave strength (or the received signal strength indicator (RSSI) of a radio wave, and hereinafter called the "radio wave strength" in some cases). Upon receiving the relevant message, each of the terminals 100-1 and 100-2 measures the radio wave strengths of a coupled base station and neighboring base stations. In a case where the measured radio wave strengths are greater than or equal to, for example, a first threshold value included in the relevant messages, the terminals 100-1 and 100-2 transmit, to the base stations 200-1 and 200-2, respectively, MEASUREMENT REPORT messages including the radio wave strengths. Based on the radio wave strengths included in the MEASUREMENT REPORT messages, the base stations 200-1 and 200-2 determine whether or not to hand over the terminals 100-1 and 100-2, respectively. Results thereof are transmitted to the terminals 100-1 and 100-2, and in accordance with the relevant results, the terminals 100-1 and 100-2 are handed over to other base stations or continue coupling to the base stations 200-1 and 200-2, respectively, while not being handed over to other base stations.

Note that the example of FIG. 2 indicates an example in which the terminal 100-1 wirelessly communicates with the base station 200-1 and the terminal 100-2 wirelessly communicates with the base station 200-2. In the wireless communication system 10, the number of the terminals 100-1, the terminals 100-2, the base stations 200-1, or the base stations 200-2 may be one or more, and the number of the terminals 100-1 or 100-2 that wirelessly communicate with the base station 200-1 or 200-2 may be two or more.

In what follows, the terminals 100-1 and 100-2 are called terminals 100 in some cases, and the base stations 200-1 and 200-2 are called base stations 200 in some cases.

(Example of Configuration of Terminal Device)

Figure 3:
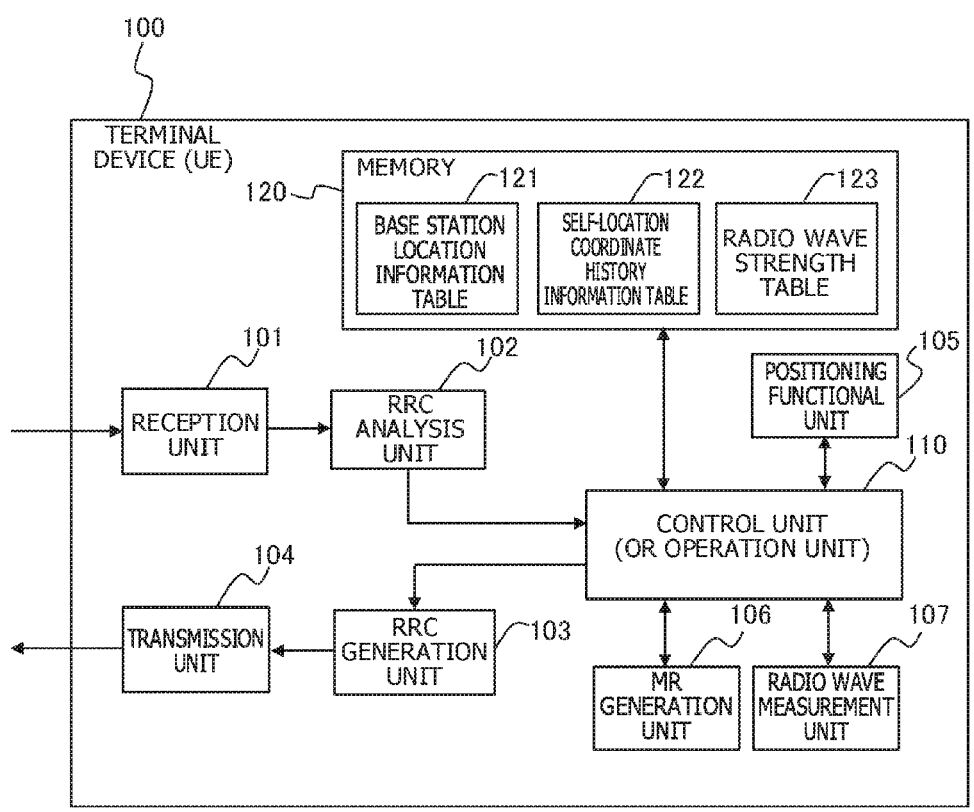
FIG. 3 is a diagram illustrating an example of a configuration of a terminal device.

Next, an example of a configuration of the terminal 100 will be described. FIG. 3 is a diagram illustrating an example of the configuration of the terminal device 100.

The terminal 100 includes a reception unit 101, a radio resource control (RRC) analysis unit 102, a RRC generation unit 103, a transmission unit 104, a positioning functional unit 105, a measurement report (MR) generation unit 106, and the radio wave measurement unit 107.

In addition, the terminal 100 includes a control unit (or an operation unit, and hereinafter called the "control unit" in some cases) 110 and a memory 120. A base station location information table 121, a self-location coordinate history information table 122, and a radio wave strength table 123 are stored in the memory 120.

Note that the first control unit 130 in the first embodiment corresponds to, for example, the control unit 110.

The reception unit 101 receives a wireless signal transmitted by the base station 200 and subjects the received wireless signal to frequency conversion processing, demodulation processing, error correction decoding processing, and so forth, thereby extracting an RRC message and so forth. The reception unit 101 outputs the extracted RRC message to the RRC analysis unit 102.

The RRC analysis unit 102 analyzes what RRC message the RRC message output by the reception unit 101 is. The RRC analysis unit 102 analyzes whether or not the RRC message is, for example, a MEASUREMENT CONTROL REQ message or whether or not the RRC message is, for example, a message relating to annunciation information. In addition, the RRC analysis unit 102 outputs the analyzed RRC message to the control unit 110.

In accordance with an instruction from the control unit 110, the RRC generation unit 103 generates an RRC message and outputs the generated RRC message to the transmission unit 104.

The transmission unit 104 subjects the RRC message output by the RRC generation unit 103 to error correction coding processing, modulation processing, frequency conversion processing, and so forth, thereby converting the RRC message into a wireless signal. The transmission unit 104 transmits the wireless signal to the base station 200.

In accordance with an instruction from the control unit 110, the positioning functional unit 105 positions the location of the terminal 100. The positioning functional unit 105 may position the location of the terminal 100 by using, for example, a Global Positioning System (GPS). Upon positioning the location of the terminal 100, the positioning functional unit 105 outputs, to the control unit 110, location information indicating the location of the terminal 100.

In accordance with an instruction from the control unit 110, the MR generation unit 106 generates a MEASUREMENT REPORT message. The MR generation unit 106 outputs the generated MEASUREMENT REPORT message to the control unit 110, and the control unit 110 outputs the relevant message to the RRC generation unit 103. Note that the MEASUREMENT REPORT message may be generated by the RRC generation unit 103 and in this case the MR generation unit 106 may be omitted.

In accordance with an instruction from the control unit 110, the radio wave measurement unit 107 measures the radio wave strengths of wireless signals (or wireless radio waves) received by the reception unit 101. The radio wave measurement unit 107 outputs the radio wave strengths of respective base stations 200 to the control unit 110. The radio wave measurement unit 107 may be coupled to the reception unit 101, thereby measuring the radio wave strengths of the wireless signals received by the reception unit 101.

The control unit 110 controls individual units in the terminal 100. In addition, upon receiving the MEASUREMENT CONTROL REQ message from the RRC analysis unit 102, the control unit 110 sets a parameter and a threshold value (the first threshold value), included in the relevant message. In addition, in a case where the radio wave strength of the base station 200, received from the radio wave measurement unit 107, is greater than or equal to the first threshold value, the control unit 110 instructs the MR generation unit 106 to issue a MEASUREMENT REPORT message. Details of issuing processing for the MEASUREMENT REPORT message will be described later.

In addition, the control unit 110 accesses the memory 120 and stores respective pieces of information in the base station location information table 121, the self-location coordinate history information table 122, and the radio wave strength table 123.

FIG. 4A is a diagram illustrating an example of the base station location information table 121. Location information and communication type information of base stations are stored in the base station location information table 121. As for the location information, the location of the base station 200 is represented by, for example, a longitude and a latitude. The communication type information is, for example, information relating to a wireless communication method with which the base station 200 is able to perform wireless communication. As the communication type information, an LTE system and a 3G system (for example, a wideband code division multiple access (W-CDMA) system or Global System for Mobile communication (GSM (registered trademark))) are cited.

The control unit 110 receives a message relating to, for example, annunciation information from the RRC analysis unit 102, extracts, from the annunciation information, the location information and the communication type information of base stations, and stores these extracted pieces of information in the base station location information table 121. The annunciation information includes, as neighboring base station information, the location information and the communication type information of individual neighboring base stations (for example, "LTE_B" and "3G_A") around a coupled base station (for example, "LTE_A"). The term "neighboring base station" means, for example, a base station whose service provision-enabled range overlaps with that of the coupled base station. The annunciation information may include the location information and the communication type information of each of the coupled base station and the neighboring base stations.

FIG. 4B is a diagram illustrating an example of the self-location coordinate history information table 122. Time information indicating a time when the location of the terminal 100 is positioned and location information indicating the location of the terminal 100 are stored in the self-location coordinate history information table 122. The location information and the time information of the terminal 100 are, for example, pieces of information positioned by the positioning functional unit 105, received by the control unit 110, and stored in the self-location coordinate history information table 122. As illustrated in FIG. 4B, the positioning functional unit 105 may periodically position the location information of the terminal 100, and the control unit 110 may sequentially store the time information and the location information in the self-location coordinate history information table 122.

FIG. 4C is a diagram illustrating an example of the radio wave strength table 123. The radio wave strengths of, for example, the coupled base station (for example, "LTE_A") and the neighboring base stations (for example, "LTE_B" and "3G_A") are stored in the radio wave strength table 123. The control unit 110 receives a radio wave strength from, for example, the radio wave measurement unit 107 and arbitrarily stores the radio wave strength in the radio wave strength table 123. The radio wave strengths of the respective base stations 100 may be arbitrarily overwritten in the radio wave strength table 123.

(Example of Configuration of Base Station Device)

Figure 5:
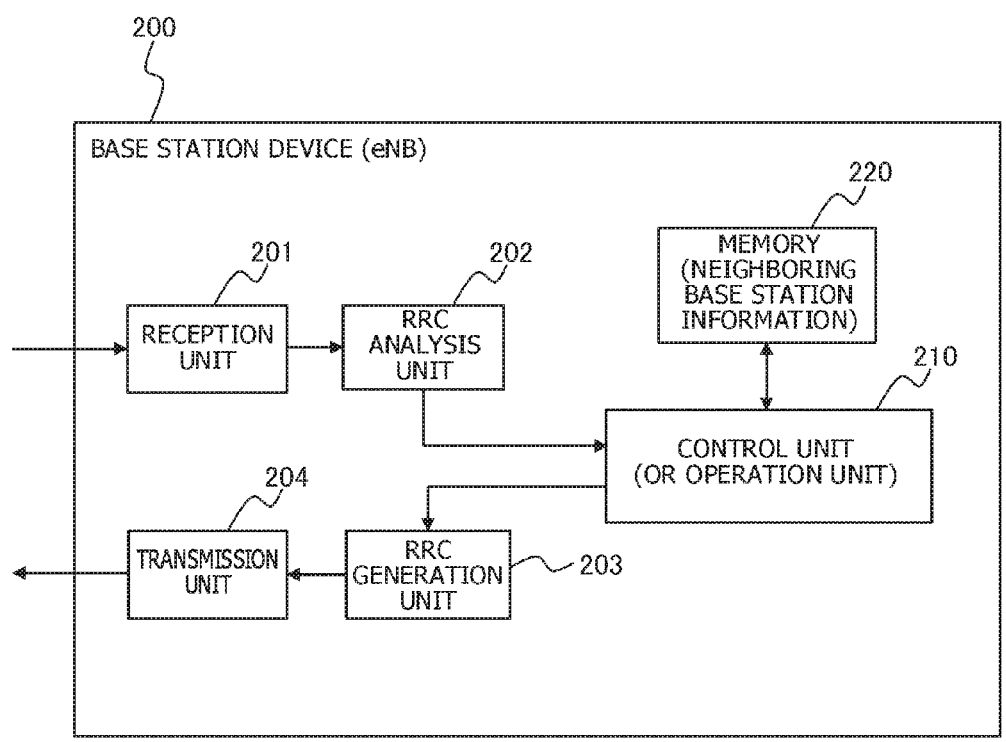
FIG. 5 is a diagram illustrating an example of a configuration of a base station device.

Next, an example of a configuration of the base station 200 will be described. FIG. 5 is a diagram illustrating an example of the configuration of the base station device 200.

The base station 200 includes a reception unit 201, an RRC analysis unit 202, an RRC generation unit 203, a transmission unit 204, a control unit (or an operation unit, and hereinafter called a "control unit" in some cases) 210, and a memory 220.

Note that the second control unit 230 in the first embodiment corresponds to, for example, the control unit 210.

The reception unit 201 receives a wireless signal transmitted by the terminal 100 and subjects the received wireless signal to frequency conversion processing, demodulation processing, error correction decoding processing, and so forth, thereby extracting an RRC message and so forth. The reception unit 201 outputs the extracted RRC message to the RRC analysis unit 202.

The RRC analysis unit 202 analyzes the RRC message output by the reception unit 201. The RRC analysis unit 202 outputs the analyzed RRC message to the control unit 210. As such an RRC message, for example, a MEASUREMENT REPORT message is cited.

In accordance with an instruction from the control unit 210, the RRC generation unit 203 generates an RRC message and outputs the generated RRC message to the transmission unit 204. As the RRC message, a MEASUREMENT CONTROL REQ message and a message relating to annunciation information are cited.

In accordance with an instruction from, for example, the control unit 210, the RRC generation unit 203 generates a MEASUREMENT CONTROL REQ message. In this case, the RRC generation unit 203 receives a parameter, a threshold value, and so forth from the control unit 210 and generates the MEASUREMENT CONTROL REQ message including the parameter and the threshold value.

In accordance with an instruction from, for example, the control unit 210, the RRC generation unit 203 generates an RRC message relating to annunciation information. In this case, the RRC generation unit 203 receives neighboring base station information from the control unit 210 and generates the RRC message including the neighboring base station information.

The transmission unit 204 subjects the RRC message output by the RRC generation unit 203 to error correction coding processing, modulation processing, frequency conversion processing, and so forth and converts the relevant message to a wireless signal. The transmission unit 204 transmits the converted wireless signal to the terminal 100.

The control unit 210 controls the entire base station 200. In addition, the control unit 210 reads the neighboring base station information from the memory 220 and instructs the RRC generation unit 203 to generate the annunciation information including the neighboring base station information. Furthermore, the control unit 210 instructs the RRC generation unit 203 to generate the MEASUREMENT CONTROL REQ message. Furthermore, based on a radio wave strength included in the MEASUREMENT REPORT message, the control unit 210 judges whether or not to cause the terminal 100 to perform hand over. Details of processing performed in the control unit 210 will be described later.

The memory 220 stores therein the neighboring base station information and so forth. The neighboring base station information includes the location information and the communication type information of neighboring base stations. The neighboring base station information may include the location information, the communication type information, and so forth of the station 200 itself.

(Example of Operation)

Next, an example of an operation in the wireless communication system 10 will be described. The example of an operation will be described in the following order.

(1.1 Example of Entire Operation)
(1.2 Example of Operation in Terminal 100)
(1.3 Example of Operation in Base Station 200)
(1.1 Example of Entire Operation)

Figure 6:
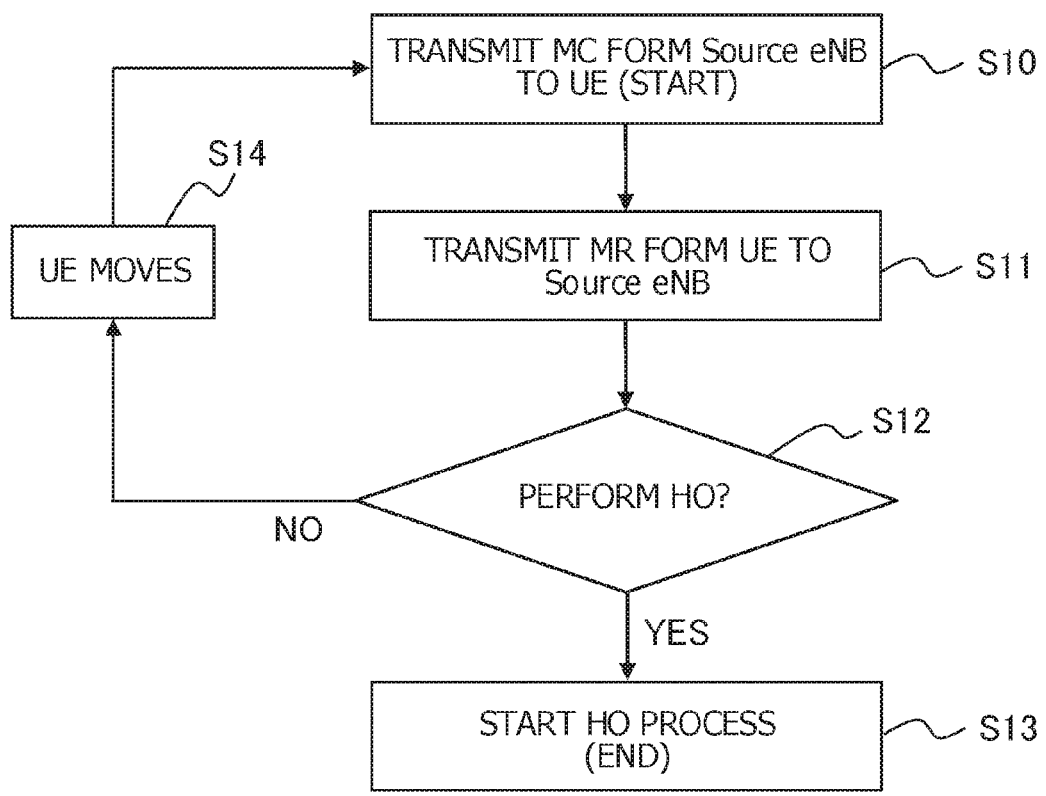
FIG. 6 is a flowchart illustrating an example of an entire operation.

First, an example of an operation of the entire wireless communication system 10 will be described. FIG. 6 is a flowchart illustrating an example of the operation of the entire wireless communication system 10.

Note that, in some cases, the coupled base station 200 to which the terminal 100 is wirelessly coupled before hand over is called a source base station (Source evolved Node B (eNB)) 200 and the base station 200 that is included in neighboring base stations and that serves as a hand over target is called the target base station 200.

The source base station 200 transmits a MEASUREMENT CONTROL REQ message to the terminal (user equipment (UE)) 100, thereby starting processing (S10).

Upon receiving the MEASUREMENT CONTROL REQ message from the source base station 200, the terminal 100 measures the radio wave strengths of a source base station and neighboring base stations. In addition, in a case where at least one of the measured radio wave strengths is greater than or equal to the first threshold value, the terminal 100 transmits, to the source base station 200, a MEASUREMENT REPORT message including the measured radio wave strengths (S11). In the present second embodiment, the terminal 100 transmits, to the source base station 200, the MEASUREMENT REPORT message including a radio wave strength obtained by changing the corresponding measured radio wave strength. Details thereof will be described later.

Upon receiving the MEASUREMENT REPORT message, the source base station 200 judges, based on the radio wave strengths included in the relevant message, whether or not to perform hand over (HO) (S12).

In a case where the source base station 200 judges that hand over is not to be performed (S12: NO), the terminal 100 moves while not performing hand over (S14). In addition, the processing makes a transition to S10, and the above-mentioned processing operations are repeated.

On the other hand, in a case where the source base station 200 judges that hand over is to be performed (S12: YES), the source base station 200 starts a hand over process (S13). In addition, a series of processing operations is terminated.

(1.2 Example of Operation in Terminal 100)

Figure 7:
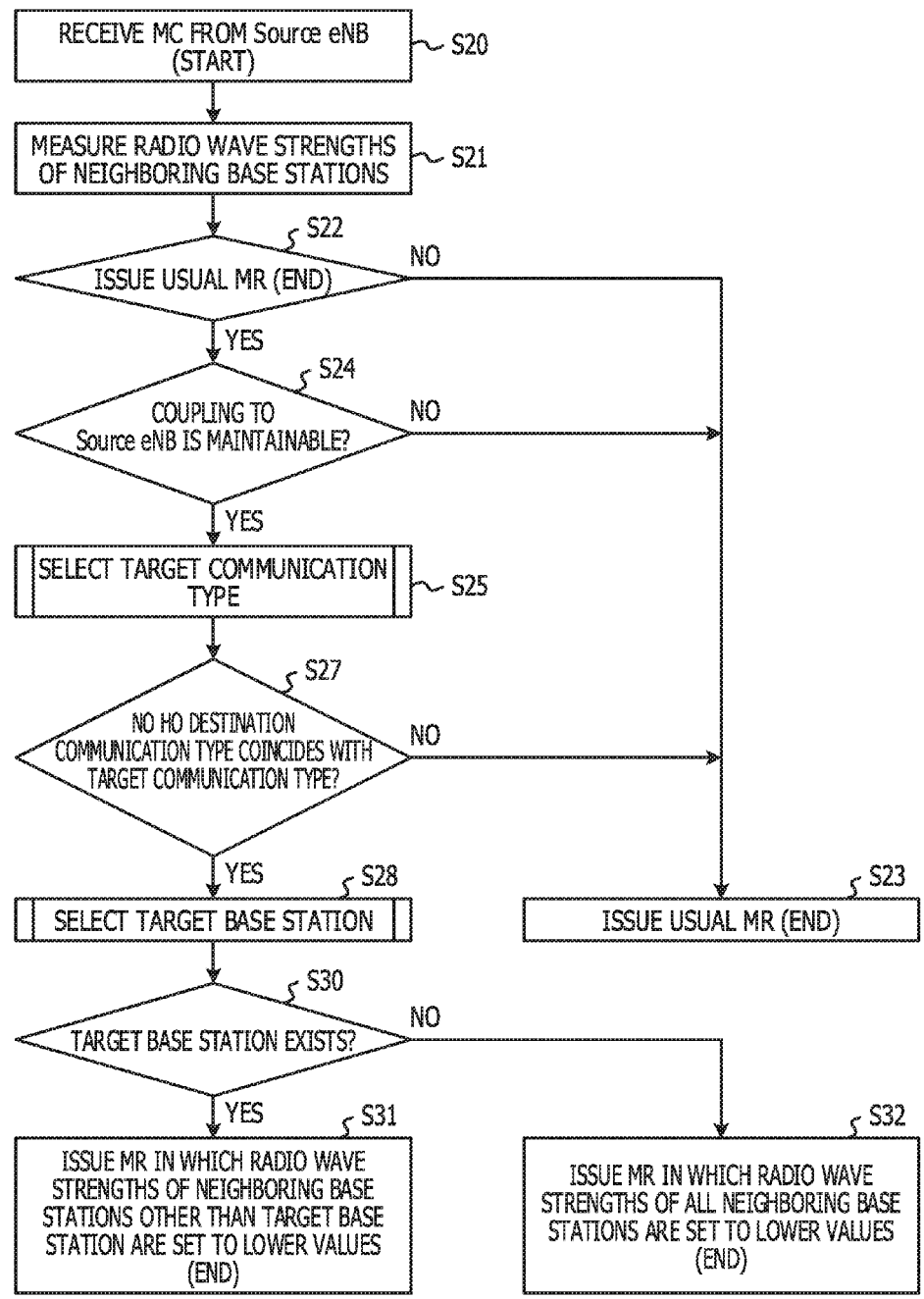
FIG. 7 is a flowchart illustrating an example of an operation in a terminal device.

Next, an example of an operation in the terminal 100 will be described. FIG. 7 is a flowchart illustrating an example of the operation in the terminal device 100, which is an example of issuing processing for the MEASUREMENT REPORT message. The flowchart in FIG. 7 illustrates examples of processing operations from S10 to S11 in FIG. 6.

Upon receiving the MEASUREMENT CONTROL REQ message from the source base station 200, the terminal 100 starts processing (S20). Upon receiving the MEASUREMENT CONTROL REQ message from, for example, the RRC analysis unit 202, the control unit 110 starts the processing.

Next, the terminal 100 measures the radio wave strengths of neighboring base stations (S21). For example, the following processing operations are performed. In other words, upon receiving the MEASUREMENT CONTROL REQ message, the control unit 110 instructs the radio wave measurement unit 107 to measure the radio wave strengths of the neighboring base stations. In addition, the control unit 110 receives, from the radio wave measurement unit 107, the radio wave strengths (values indicating the radio wave strengths and hereinafter called the "radio wave strengths" in some cases) of the neighboring base stations and stores the radio wave strengths in the radio wave strength table 123. The radio wave measurement unit 107 may measure the radio wave strength of the source base station 200, and in this case, the control unit 110 stores the radio wave strength of the source base station 200 in the radio wave strength table 123.

Next, based on the measured radio wave strengths, the terminal 100 judges whether or not to perform hand over (S22). Whether or not to perform hand over is judged based on the same processing as in a case where it is determined whether or not the base station 200 causes the terminal 100 to perform hand over, based on a usual hand over process.

For example, the following processing operations are performed. In other words, the control unit 110 reads the radio wave strengths of the source base station 200 and neighboring base stations from the radio wave strength table 123. In a case where the strongest radio wave strength among the radio wave strengths of the neighboring base stations is stronger (or higher) than the first threshold value and the strongest radio wave strength is stronger (or higher) than the radio wave strength of the source base station 200, the control unit 110 judges that hand over is to be performed. In this case, a base station having the strongest radio wave strength among the neighboring base stations may be, for example, a base station serving as a hand over destination. In this case, the control unit 110 may store, in the memory 120, information relating to the base station serving as a hand over destination. On the other hand, in a case where the radio wave strengths of the neighboring base stations are less than or equal to the first threshold value or in a case where the radio wave strength of the source base station 200 is greater than or equal to the strongest radio wave strength among the radio wave strengths of the neighboring base stations, the control unit 110 judges that hand over is not to be performed.

In a case of judging that hand over is not to be performed (S22: NO), the terminal 100 issues a usual MEASUREMENT REPORT message (S23). The term "usual MEASUREMENT REPORT message" means, for example, a MEASUREMENT REPORT message including an unchanged radio wave strength measured by the radio wave measurement unit 107. In this case, the radio wave strength of the source base station 200 itself is greater than or equal to those of the neighboring base stations. Therefore, the source base station 200 performs processing so as to cause the terminal 100 to perform no hand over and to maintain coupling to the source base station 200.

On the other hand, in a case of judging that hand over is to be performed (S22: YES), the terminal 100 judges whether or not coupling to the source base station 200 is maintainable (S24). If coupling to the source base station 200 is maintainable, the terminal 100 is able to perform subsequent processing operations. In addition, if coupling to the source base station 200 is not maintainable, the terminal 100 continuously performs wireless communication by performing the usual hand over process.

Whether or not coupling to the source base station 200 is maintainable may be judged by comparing the radio wave strength of the source base station 200 with, for example, a second threshold value. The control unit 110 reads the second threshold value stored in, for example, the memory 120 and the radio wave strength of the source base station 200, stored in the radio wave strength table 123 and compares the two with each other, thereby performing judgment.

In a case of judging that coupling to the source base station 200 is not maintainable (S24: NO), the terminal 100 issues a usual MEASUREMENT REPORT message (S23). In this case, it becomes difficult for the terminal 100 to be coupled to, for example, the source base station 200, and based on the usual hand over process, the terminal 100 is handed over to a neighboring base station whose radio wave strength is the strongest (or the highest) among the neighboring base stations.

On the other hand, in a case of judging that coupling to the source base station 200 is maintainable (S24: YES), the terminal 100 performs processing operations (S25 to S28) for determining a target base station.

In the processing operations (S25 to S28) for determining a target base station, first the terminal 100 determines a candidate group (hereinafter, called a "target candidate base station group" in some cases) of target candidate base stations that may serve as a target base station (S25). In addition, from among target candidate base stations included in the target candidate base station group, the terminal 100 determines the target base station (S28). Finally, in accordance with the presence or absence of the target base station, the terminal 100 changes the radio wave strengths of neighboring base stations or the source base station 200 (S31 or S32).

Figure 8:
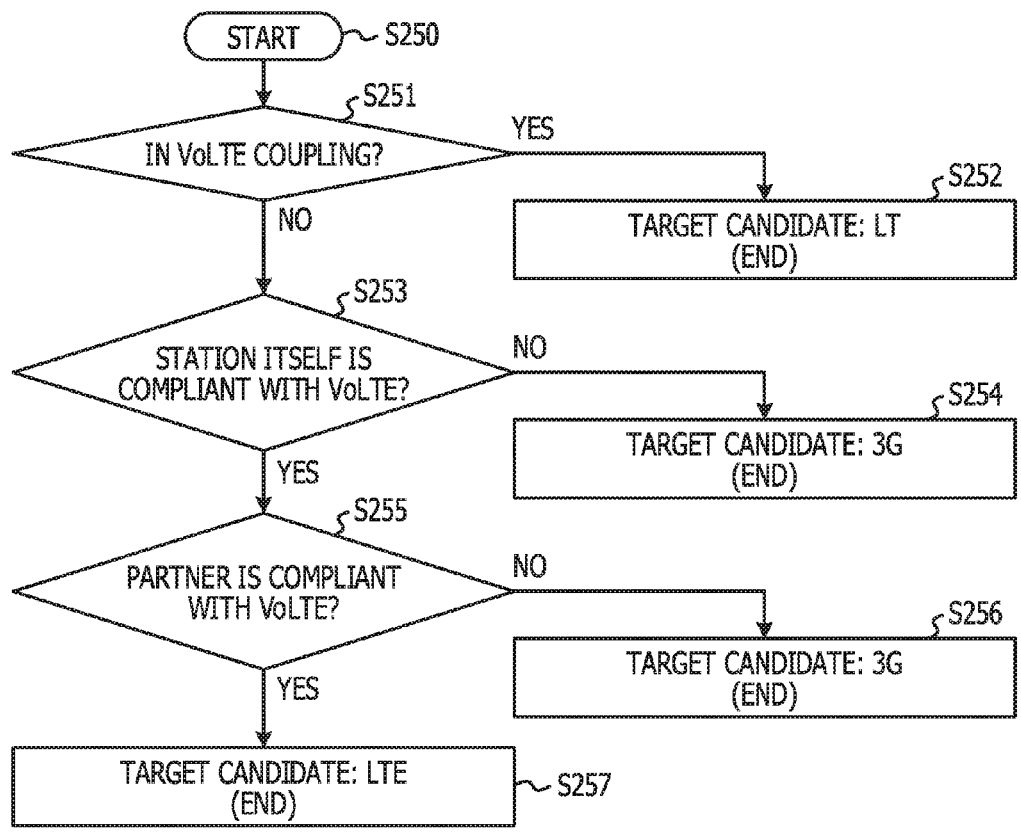
FIG. 8 is a flowchart illustrating an example of determination processing for a target candidate base station group.
Figure 9:
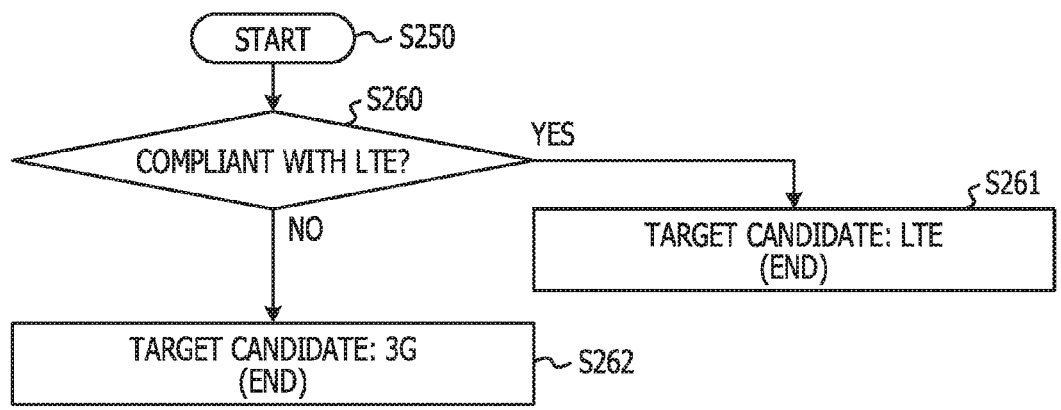
FIG. 9 is a flowchart illustrating an example of determination processing for a target candidate base station group.

Hereinafter, descriptions will be performed in order. FIG. 8 and FIG. 9 are flowcharts each illustrating an example of determination processing (S25) for a target candidate base station group. Based on this determination processing (S25), the terminal 100 determines which neighboring base stations to define as the target candidate base station group from among the neighboring base stations.

In a case where the terminal 100 is in a telephone call, a communication partner is, for example, a terminal serving as a call opposite party. In addition, in a case where the terminal 100 is in packet communication, the communication partner is, for example, a server device. In this way, depending on whether the terminal 100 is in a telephone call or in packet communication, the type of a device serving as a communication partner is different. If the type of a device serving as a communication partner is different, a communication type is different in accordance with the relevant type of a device in some cases. Therefore, the determination processing for the target base station group is defined so as to be processing different depending on a case where the terminal 100 is in a telephone call and a case where the terminal 100 is in packet communication.

FIG. 8 illustrates an example of the determination processing in a case of being in a telephone call, and FIG. 9 illustrates an example of the determination processing in a case of being in packet communication.

In a case where the terminal 100 is in a telephone call, if the processing is started (S250 in FIG. 8), it is judged whether or not a telephone call is made using VoLTE (S251). VoLTE is a system in which, for example, the terminal 100 and a terminal serving as a call partner transmit and receive voice data to and from each other by using predetermined packets, and VoLTE is a system based on the assumption of an LTE system. If two terminals that make telephone calls to each other are terminals compliant with VoLTE, it is possible to make telephone calls based on VoLTE.

Whether or not a telephone call is made based on VoLTE is judged, for example, as follows. In other words, based on whether or not an instruction is issued to the RRC generation unit 203 to generate packet data compliant with VoLTE, the control unit 110 may judge. Alternatively, based on whether or not a program for making a telephone call by using VoLTE is read from the memory 120 and the relevant program is executed, the control unit 110 may judge.

In a case of making a telephone call by using VoLTE (S251: YES), the terminal 100 defines, from among the neighboring base stations, all neighboring base stations whose communication types correspond to the LTE system, as the target candidate base station group (S252). In a case where the terminal 100 makes a telephone call by using, for example, VoLTE, if the communication type of a base station serving as a hand over destination is the LTE system, it is possible to continue making a telephone call based on VoLTE while not changing the communication type after hand over.

In a case of judging that a telephone call is made by using, for example, VoLTE, based on the communication type information stored in the base station location information table 121, the control unit 110 selects, as the target candidate base station group, all neighboring base stations whose communication types correspond to the LTE system. The control unit 110 may store, in the memory 120, information of the neighboring base stations selected as the target candidate base station group.

On the other hand, in a case of not making a telephone call by using VoLTE (S251: NO), the terminal 100 judges whether or not the station itself is compliant with VoLTE (S253). Since, for example, flag information of whether or not the station itself is compliant with VoLTE is stored in the memory 120, the control unit 110 judges based on the relevant flag information.

In a case where the terminal 100 (or the station itself) is not compliant with VoLTE (S253: NO), all neighboring base stations whose communication types correspond to a 3G system are defined, as the target candidate base station group, from among the neighboring base stations (S254). In a case where the terminal 100 does not make a telephone call by using VoLTE (S251: NO) and is not compliant with VoLTE (S253: NO), it is thought that the terminal 100 is a terminal compliant with the 3G system and makes a telephone call by using the 3G system. In such a case, in order to continue making a telephone call by using the 3G system, the terminal 100 selects, as the target candidate base station group, neighboring base stations whose communication types correspond to the 3G system. Based on, for example, the communication type information stored in the base station location information table 121, the control unit 110 may determine, as the target candidate base station group, all neighboring base stations whose communication types correspond to the 3G system. In this case, the control unit 110 may store, in the memory 120, information of the neighboring base stations selected as the target candidate base station group.

On the other hand, in a case where the terminal 100 is compliant with VoLTE (S253: YES), it is judged whether or not a terminal serving as a call opposite party is compliant with VoLTE (S255). If a terminal serving as a communication opposite party is compliant with, for example, VoLTE, it becomes possible for the terminal 100 to make a telephone call by using VoLTE, even at a hand over destination. In consideration of the communication type of a call opposite party, the terminal 100 judges the present processing.

For example, the following processing operations are performed. In other words, before starting making a telephone call, the terminal 100 exchanges, with a terminal serving as a call partner, information relating to whether or not the station itself is compliant with VoLTE. At this time, the control unit 110 stores the relevant information in the memory 120. In addition, at the time of the present processing operation (S255), the control unit 110 reads, from the memory 120, information of whether or not a terminal serving as a call partner is compliant with VoLTE and judges the present processing operation (S255), based on the relevant information.

In a case where a terminal serving as a call opposite party is not compliant with VoLTE (S255: NO), the terminal 100 defines, from among the neighboring base stations, all neighboring base stations whose communication types correspond to the 3G system, as the candidate group of target base stations (S256). Even if the terminal 100 itself is compliant with VoLTE (S253: YES), in a case where a terminal serving as a communication opposite party is not compliant with VoLTE (S255: NO), it is difficult for the terminal 100 to make a telephone call by using VoLTE. In consideration of the communication type of a terminal serving as a communication opposite party, the terminal 100 selects, as the target candidate base station group, all neighboring base stations based on the 3G system.

On the other hand, in a case where a call opposite party is compliant with VoLTE (S255: YES), the terminal 100 defines, from among the neighboring base stations, all neighboring base stations whose communication types correspond to the LTE system, as the candidate group of target base stations (S257). If the terminal 100 and the terminal serving as a communication opposite party are compliant with VoLTE (S253: YES and S255: YES), it is possible to perform communication based on the LTE system. Therefore, the terminal 100 selects, as the target candidate base station group, all neighboring base stations whose communication types correspond to the LTE system.

From the above, the terminal 100 determines the target candidate base station group (S252, S254, S256, and S257). The control unit 110 stores, in the memory 120, for example, information (information such as the communication type) of the neighboring base stations selected as the target candidate base station group.

On the other hand, in a case where the terminal 100 is in packet communication, determination processing for the target candidate base station group is performed as follows. In other words, in a case where the terminal 100 starts the processing (S250 in FIG. 9), it is judged whether or not the terminal 100 is performing packet communication by using the LTE system (S260).

In a case of performing packet communication by using the LTE system (S260: YES), the terminal 100 defines, as the target candidate base station group, all neighboring base stations whose communication methods correspond to the LTE system, from among the neighboring base stations (S261). If performing packet communication by using the LTE system, the terminal 100 selects, as neighboring base stations based on the LTE system, the target candidate base station group in consideration of continuing performing wireless communication based on the LTE system without changing the communication type after hand over.

On the other hand, in a case where the terminal 100 does not perform packet communication by using the LTE system (S260: NO), all neighboring base stations that perform wireless communication by using the 3G system are defined as a candidate group for a target base station, from among neighboring base stations (S262). In this case, if performing wireless communication by using the 3G system, the terminal 100 selects, as neighboring base stations based on the 3G system, the target candidate base station group in consideration of continuing performing wireless communication based on the 3G system without changing the communication type after hand over.

Information of, for example, whether or not the terminal 100 itself is compliant with LTE is stored in the memory 110, and the control unit 110 may judge S260, based on the relevant information.

From the above, the terminal 100 determines the target candidate base station group during packet communication (S261 and S262). The control unit 110 stores, in the memory 120, for example, information (information such as the communication type) of the neighboring base stations selected as the target candidate base station group, and the control unit 110 makes a transition to the processing operation in S27 in FIG. 7.

In S27 in FIG. 7, the terminal 100 judges whether no communication type of a base station serving as a hand over destination coincides with the communication type (hereinafter, called a "target communication type" in some cases) of the target candidate base station group, determined in S25.

The term "base station serving as a hand over destination" means, for example, a base station serving as a hand over destination, determined in S22. If there are, for example, neighboring base stations, which have radio wave strengths greater than or equal to the first threshold value, the base station serving as a hand over destination is a neighboring base station having a maximum radio wave strength. If the usual hand over process is performed, the terminal 100 is handed over to such a base station serving as a hand over destination. On the other hand, in S25, in consideration of the communication type of a neighboring base station and so forth, the terminal 100 determines the target candidate base station group.

In a case where the communication type of a base station serving as a hand over destination coincides with the target communication type (S27: NO), the terminal 100 issues a usual MEASUREMENT REPORT message (S23). In this case, the terminal 100 is able to perform hand over without switching a communication type.

On the other hand, in a case where no communication type of a base station serving as a hand over destination coincides with the target communication type (S27: YES), the terminal 100 performs selection processing for a target base station (S28).

In the selection processing for the target base station, for example, neighboring base stations, which are equal in communication type used by the source base station 100 for wireless communication and which are located, based on a predetermined indicator, within a given range, are selected as target candidate base stations. Each of the target candidate base stations is, for example, a base station that may be a base station serving as a hand over destination of the terminal 100.

The control unit 110 may read, for example, respective pieces of information about the communication type of the base station serving as a hand over destination and the target communication type, stored in the memory 120, and may compare the two with each other, thereby performing the present processing operation (S27).

Figure 10:
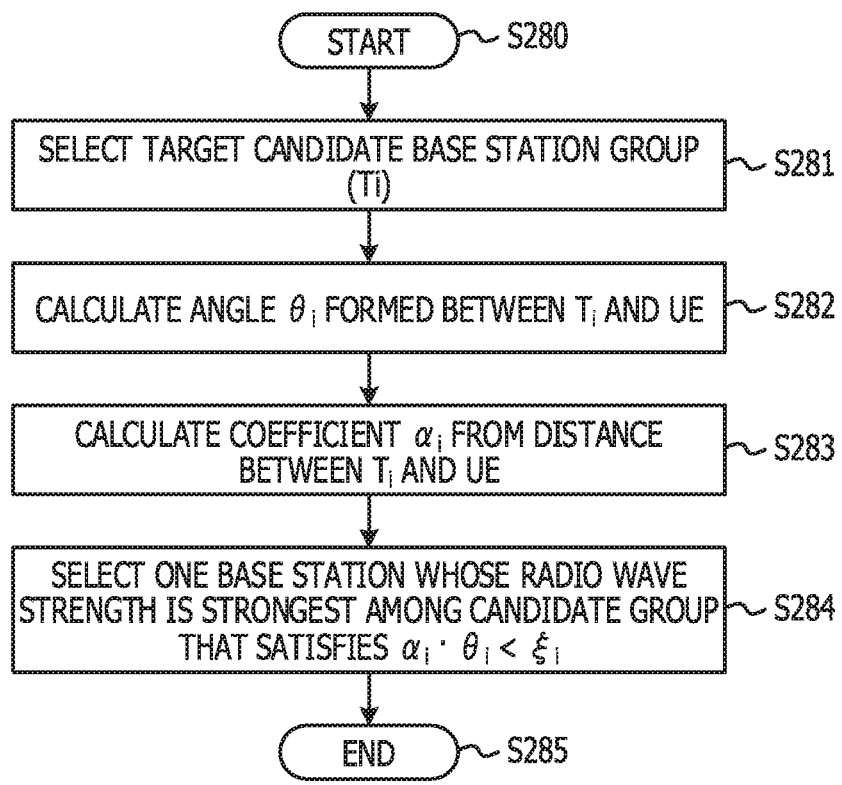
FIG. 10 is a flowchart illustrating an example of selection processing for a target base station.
Figure 11:
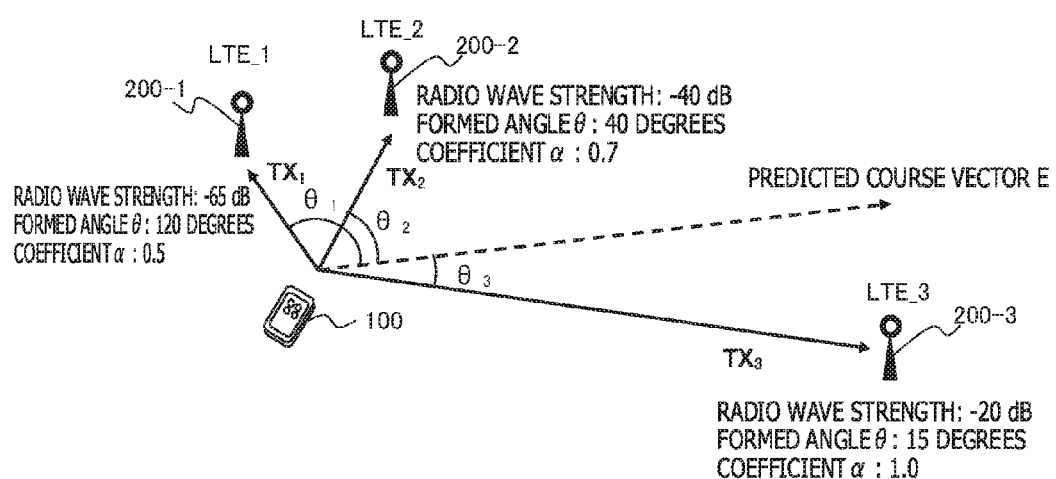
FIG. 11 is a diagram for explaining an example of the selection processing for the target base station.

FIG. 10 is a flowchart illustrating an example of selection processing for a target base station. In addition, FIG. 11 illustrates an example of the selection processing for the target base station. With arbitrary reference to FIG. 11, the selection processing for the target base station will be described.

Upon starting the processing (S280), the terminal 100 selects a target candidate base station group (S281). The example of FIG. 11 illustrates an example in which three target candidate base stations ("LTE_1" to "LTE_3") 200-1 to 200-3 are selected as a target candidate base station group. By reading information of, for example, a target candidate base station $T_i$ from the memory 220, the control unit 110 performs the present processing.

Next, the terminal 100 calculates an angle $\theta_i$ formed between the target candidate base station $T_i$ and the terminal 100 (S282). FIG. 11 illustrates an example in which angles $\theta_1$ to $\theta_3$ formed with the three target candidate base stations 200-1 to 200-3, respectively, are calculated.

The formed angle $\theta_i$ is calculated by, for example, the control unit 110, based on a predicted course vector E and a vector $TX_i$ toward the target candidate base station $T_i$.

The predicted course vector E is calculated, for example, as follows. In other words, based on the location information of the terminal 100, stored in the self-location coordinate history information table 122, the control unit 110 calculates the predicted course vector E. In this case, the control unit 110 may calculate the predicted course vector E from the most recent two pieces of location information and may calculate the predicted course vector E from the average of a predetermined number of pieces of location information.

In addition, the vector TX toward the target candidate base station $T_i$ is calculated, for example, as follows. In other words, the control unit 110 reads the location information of the target candidate base station $T_i$ from the base station location information table 121. In addition, the control unit 110 reads, from the self-location coordinate history information table 122, the location information of the current location (or the latest location information out of pieces of location information stored in the self-location coordinate history information table 122) of the terminal 100. In addition, based on the two pieces of location information, the control unit 110 calculates the vector $TX_i$ toward the target candidate base station $T_i$.

In addition, the terminal 100 substitutes the two calculated vectors E and $TX_i$ into the following Expression, thereby obtaining the angle $\theta_i$ formed between the target candidate base station $T_i$ and the terminal 100.

$$\theta_i = \cos^{-1} \frac{E \cdot TX_i}{|E||TX_i|} \quad (1)$$

In, for example, the memory 120, Expression (1) is stored, and the control unit 110 reads Expression (1) from the memory 120 and substitutes the two calculated vectors E and $TX_i$ into Expression (1), thereby calculating the angle $\theta_i$.

Returning to FIG. 10, next the terminal 100 calculates a coefficient $\alpha_i$, based on a distance between the target candidate base station $T_i$ and the terminal 100 (S283). For example, the following processing is performed. In other words, the control unit 110 reads pieces of location information of the target candidate base station $T_i$ and the terminal 100 from the base station location information table 121 and the self-location coordinate history information table 122, respectively. In addition, in accordance with a distance from the terminal 100 to the target candidate base station $T_i$, the control unit 110 calculates the coefficient $\alpha_i$ in a range from "0" to "1". In this case, the control unit 110 calculates the coefficient $\alpha_i$ so that the value of the coefficient $\alpha_i$ draws nigh to "1" with an increase in the distance from the terminal 100 to the target candidate base station $T_i$ and the value of the coefficient $\alpha_i$ draws nigh to "0" with a decrease in the distance from the terminal 100 to the target candidate base station $T_i$.

In addition, the terminal 100 multiplies, by the coefficient $\alpha_i$ the angle $\theta_i$ formed based on the predicted course vector E and the vector $TX_i$ toward the target candidate base station $T_i$ and selects one base station whose radio wave strength is the strongest among target candidate base stations that satisfy the following Expression (S284).

$$\alpha_i \theta_i < \xi_i \quad (2)$$

As illustrated in, for example, FIG. 11, the angle $\theta_i$ formed between the target candidate base station $T_i$ and the terminal 100 decreases with an increase in the distance between the terminal 100 and the target candidate base station $T_i$, and increases with a decrease in the distance therebetween, in some cases. In a case where the terminal 100 moves in a direction toward the target candidate base station $T_i$, the formed $\theta_i$ remains small compared with a case of not moving in the direction toward the target candidate base station $T_i$. On the other hand, in a case where the terminal 100 moves in a direction away from the target candidate base station $T_i$, the formed $\theta_i$ increases compared with a case of not moving in the direction away from the target candidate base station $T_i$. In order for the target candidate base station $T_i$ to be selected as a target base station in a case where the terminal 100 moves in a direction toward the target candidate base station $T_i$, the angle $\theta_i$ is subjected to weighting by using, for example, the coefficient $\alpha_i$. The left side of Expression (2) indicates an indicator based on the angle $\theta_i$ formed between, for example, the course direction of the terminal 100 and a direction from the terminal device 100 to the target candidate base station $T_i$.

In the example of FIG. 11, the formed angle $\theta_1$ calculated using Expression (1) is "120 degrees". In addition, a distance from the terminal 100 to the target candidate base station 200-1 is the nearest to the terminal 100 among the three target candidate base stations 200-1 to 200-3. Therefore, the coefficient $\alpha$ is calculated as "0.5". Accordingly, the left side of Expression (2) is 0.5×120=60 (degrees). If the right side of Expression (2) (or a third threshold value) $\xi_i$ is "40 degrees", the target candidate base station 200-1 does not satisfy Expression (2) and is not selected as the target base station.

In the same way, as for the two target candidate base stations ($T_2$ and $T_3$) 200-2 and 200-3, the values of the left side of Expression (2) are "28 degrees" and "15 degrees", and both the two target candidate base stations ($T_2$ and $T_3$) 200-2 and 200-3 satisfy Expression (2). In this case, the two target candidate base stations 200-2 and 200-3 satisfy Expression (2), and the base station 200-2 having the strongest radio wave strength among the two target candidate base stations 200-2 and 200-3 is selected as the target base station.

In this way, even if the target candidate base station $T_1$ whose radio wave strength is the strongest exists, in a case where the terminal 100 moves in a direction significantly different from (away from) the target candidate base station $T_1$, the terminal 100 excludes the relevant target candidate base station $T_1$ from selection of the target base station. Even if being handed over to such a target candidate base station $T_1$, the terminal 100 is expected to be handed over to another base station soon. Accordingly, using the indicator of Expression (2), the terminal 100 is able to avoid a state in which, for example, hand over is repeated and to achieve reduction of the number of times hand over is performed.

While, in the example of FIG. 11, the target base station exists, there is a case where none of target candidate base stations does not satisfy Expression (2). In such a case, a case where no target base station is selected and no target base station exists occurs. In the present second embodiment, such a case is allowed.

In the present processing operation (S284), for example, the following processing operation is performed. In other words, the control unit 110 reads Expression (2) stored in the memory 120 and substitutes the formed angle $\theta_1$ calculated in S282 and the coefficient $\alpha_1$ calculated in S283 into Expression (2), thereby selecting a target base station that satisfies Expression (2). In a case where there are target base stations that satisfy Expression (2), the control unit 110 selects, as a target base station, a base station having the strongest (or highest) radio wave strength among radio wave strengths stored in the radio wave strength table 123. The control unit 110 stores information of the selected target base station in the memory 120. In a case where no target base station exists, the control unit 110 may store no information of a target base station in the memory 120 and may store, in the memory 120, information indicating the presence or absence of a target base station.

Returning to FIG. 10, upon selecting a target base station (S284), the terminal 100 terminates a series of processing operations (S285) and shifts the processing to S30 in FIG. 7.

In S30, the terminal 100 judges whether or not a target base station exists (S30).

In a case where a target base station exists (S30: YES), the terminal 100 issues a MEASUREMENT REPORT message in which the radio wave strengths of all neighboring base stations other than the target base station are changed to values weaker (or lower) than the radio wave strength of the target base station (S31).

If the target base station exists, the terminal 100 is handed over to the target base station, thereby maintaining a communication type. The terminal 100 changes the radio wave strengths of all neighboring base stations other than the target base station to values weaker (or lower) than the radio wave strength of the target base station and issues the MEASUREMENT REPORT message including such values. From this, it becomes easy to be handed over to, for example, the target base station, and it is possible for the terminal 100 to be handed over to a neighboring base station (or the target base station) without changing a communication type.

Note that, in the present second embodiment, it is assumed that "a radio wave strength is stronger than another radio wave strength" and "a radio wave strength is higher than another radio wave strength" are used for the same meaning. In the same way, it is assumed that "a radio wave strength is weaker than another radio wave strength" and "a radio wave strength is lower than another radio wave strength" are used for the same meaning.

In the present processing operation (S31), for example, the following processing operation is performed. In other words, the control unit 110 reads the information of the target base station from the memory 120 and reads the radio wave strengths of neighboring base stations from the radio wave strength table 123. In addition, the control unit 110 changes the radio wave strengths of neighboring base stations other than the target base station to values weaker than the radio wave strength of the target base station. The control unit 110 instructs the MR generation unit 106 to issue a MEASUREMENT REPORT message including the radio wave strengths changed in such a manner.

On the other hand, in a case where no target base station exists (S30: NO), the terminal 100 issues a MEASUREMENT REPORT message in which the radio wave strengths of all the neighboring base stations are changed to values weaker than the radio wave strength of the source base station 200 (S32).

In a case where no target base station exist, a case where if further moving, the terminal 100 is able to find out a target base station may be thought. Accordingly, the terminal 100 changes the radio wave strengths of all the neighboring base stations around the source base station 200 to values weaker than the radio wave strength of the source base station 200 and issues the MEASUREMENT REPORT message including such values. From this, the terminal 100 is able to maintain coupling to, for example, the source base station 200 and to avoid hand over accompanying changing of a communication type.

In the present processing operation (S32), for example, the following processing operation is performed. In other words, upon detecting that no information of a target base station is stored in the memory 120 (alternatively, detecting that no target base station exists), the control unit 110 sets the radio wave strengths of all the neighboring base stations, read from the radio wave strength table 123, to values weaker than the radio wave strength of the source base station 200. The control unit 110 instructs the MR generation unit 106 to issue a MEASUREMENT REPORT message including the radio wave strengths changed in such a manner.

Based on issuing of the MEASUREMENT REPORT message (S23, S31, or S32), the terminal 100 terminates a series of processing operations.

Figure 12:
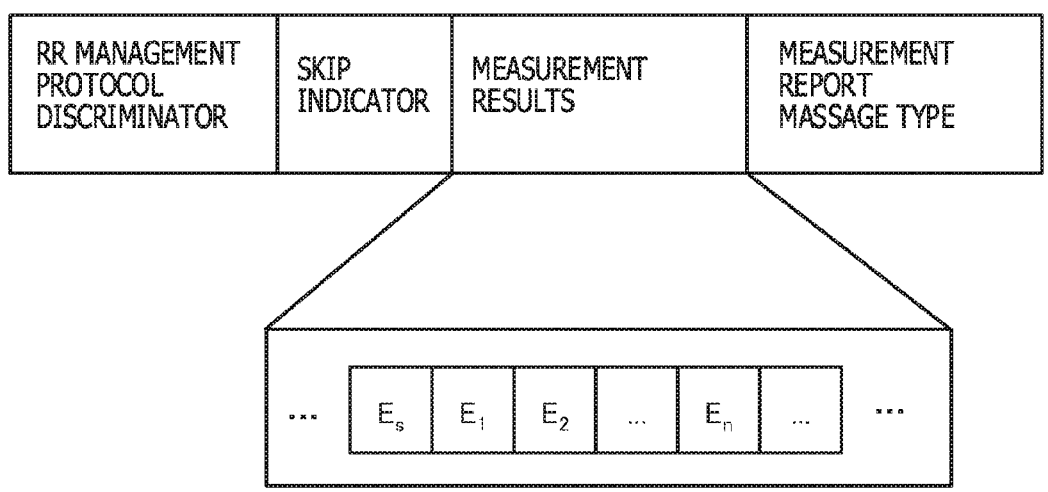
FIG. 12 is a diagram illustrating an example of a MEASUREMENT REPORT message.

FIG. 12 is a diagram illustrating an example of a MEASUREMENT REPORT message. The radio wave strength $E_s$ of the source base station 200 and the radio wave strengths $E_1, E_2, \ldots$ of neighboring base stations are inserted in a "Measurement Result" field. The example illustrated in FIG. 12 illustrates an example in which $E_n$ is the radio wave strength of the target base station and $E_n$ is the strongest radio wave strength among the radio wave strengths $E_1, E_2, \ldots$ of neighboring base stations.

(1.3 Example of Operation in Base Station 200)

Figure 13:
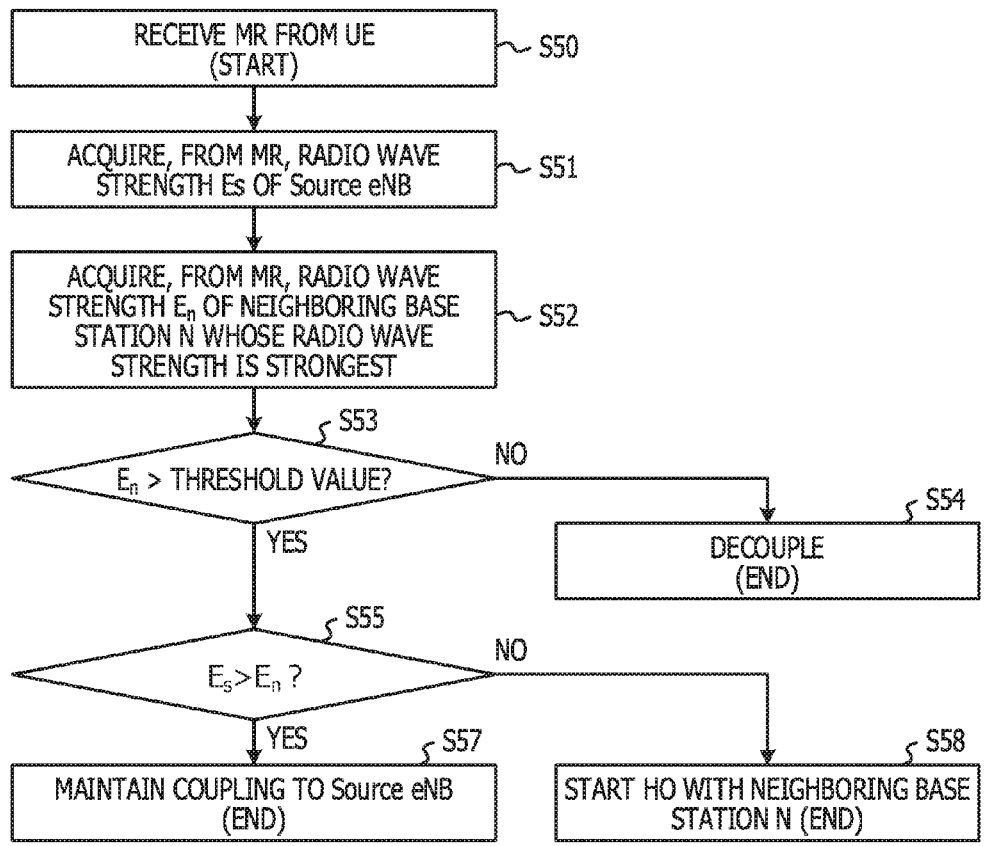
FIG. 13 is a flowchart illustrating an example of an operation in a base station device.

Next, an example of an operation of the base station 200 will be described. FIG. 13 is a flowchart illustrating an example of an operation in such a base station 200.

Upon receiving a MEASUREMENT REPORT message from the terminal 100, the base station 200 starts processing (S50).

Next, the base station 200 acquires the radio wave strength $E_s$ of the source base station from the MEASUREMENT REPORT message (S51). The control unit 210 receives the MEASUREMENT REPORT message from, for example, the RRC analysis unit 202 and extracts the radio wave strength $E_s$ of the source base station from the relevant message.

Next, the base station 200 acquires, from the MEASUREMENT REPORT message, the radio wave strength $E_n$ of a neighboring base station whose radio wave strength is the strongest (S52). From the MEASUREMENT REPORT message received from, for example, the RRC analysis unit 202, the control unit 210 extracts the radio wave strength $E_n$ of a neighboring base station whose radio wave strength is the strongest.

Next, the base station 200 judges whether or not the following Expression (3) is satisfied (S53).

$$E_s > \text{the first threshold value} \qquad (3)$$

The control unit 210 compares, for example, the radio wave strength $E_s$ acquired in S51 and the first threshold value read from the memory 120 with each other, thereby judging (S53).

In a case of judging that Expression (3) is not satisfied (S53: NO), the base station 200 terminates coupling to the terminal 100 (S54). In this case, since the terminal 100 does not obtain a radio wave strength sufficient to maintain coupling to the source base station 200, the base station 200 terminates coupling to the terminal 100. Upon judging, for example, that Expression (3) is not satisfied, the control unit 210 starts processing for terminating coupling to the terminal 100. In addition, the base station 200 terminates a series of processing operations.

On the other hand, in a case of judging that Expression (3) is satisfied (S53: YES), the base station 200 judges whether or not the following Expression (4) is satisfied (S55).

$$E_s > E_n \qquad (4)$$

The control unit 210 compares, for example, the radio wave strength $E_s$ of the source base station, acquired in S51, and the radio wave strength $E_n$, which is the strongest among neighboring base stations and which is acquired in S52, with each other.

In a case where Expression (4) is not satisfied (S55: NO), the radio wave strength $E_n$ of a neighboring base station is greater than or equal to the radio wave strength $E_s$ of the source base station. Therefore, the base station 200 starts hand over with a neighboring base station N having the radio wave strength $E_n$ (S56). In addition, the base station 200 terminates a series of processing operations.

On the other hand, in a case where Expression (4) is satisfied (S55: YES), the radio wave strength of the source base station 200 is stronger than the radio wave strength of the neighboring base station N. Therefore, the base station 200 maintains coupling to the station itself serving as the source base station 200 (S57). In addition, the base station 200 terminates a series of processing operations.

If a case of changing a radio wave strength is considered as an example, in a case where a target base station exists, the radio wave strengths of neighboring base stations other than the target base station are values weaker (or lower) than the radio wave strength of the target base station (S31 in FIG. 7). Accordingly, in this case, the radio wave strength of the target base station is the strongest radio wave strength $E_n$ among the radio wave strengths of the neighboring base stations. In this case, if Expression (4) is not satisfied (S55: NO), handing over to the target base station is started.

On the other hand, in a case where no target base station exists, the radio wave strengths of all the neighboring base stations are values weaker (lower) than the radio wave strength of the source base station (S32). In this case, Expression (4) is satisfied, and the base station 200 maintains coupling to the terminal 100.

(First Example)

Figure 14:
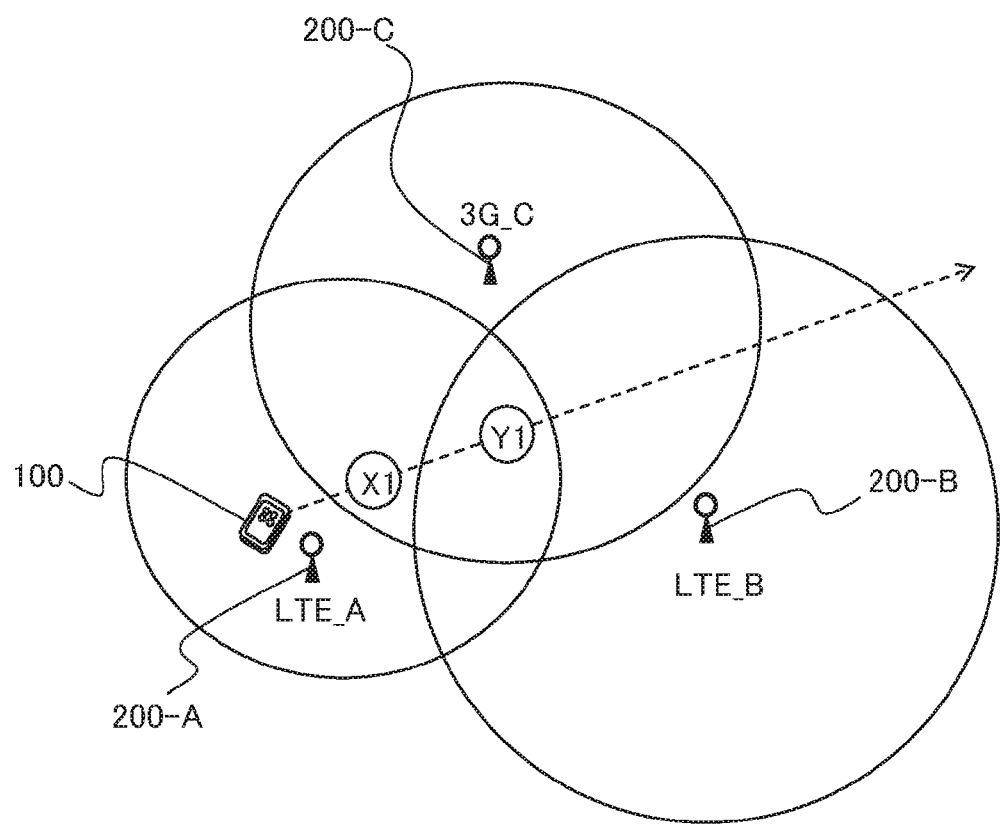
FIG. 14 is a diagram illustrating a state in which a terminal device moves in a wireless communication system.

Next, a first example will be described. FIG. 14 is illustrates a state in which a terminal device 100 moves. FIG. 14 illustrates three base stations 200-A to 200-C. Among these, the communication types of the two base stations 200-A and 200-B correspond to the LTE system, and the communication type of the base station 200-C corresponds to the 3G system.

As illustrated in FIG. 14, it is assumed that the terminal 100 is coupled to the source base station 200-A and makes a telephone call based on VoLTE or performs packet communication based on the LTE system. In addition, at two spots X1 and Y1, the terminal 100 receives MEASUREMENT CONTROL REQ messages from the source base station 200-A. How the terminal 100 operates at the two spots X1 and Y1 will be described below.

Upon receiving a MEASUREMENT CONTROL REQ message at the spot X1, the terminal 100 measures the radio wave strengths of the source base station 200-A and the neighboring base stations 200-B and 200-C (S21 in FIG. 7).

FIG. 15 illustrates an example of a radio wave strength table 123*a* including the radio wave strengths of the respective base stations 200-A to 200-C, measured at the spot X1 and the spot Y1 by the terminal 100, and an example of a radio wave strength table 123b after changing of radio wave strengths. First, the radio wave strength table 123a will be described. At the spot X1, the radio wave strength of the source base station 200-A is "−60 dB", and the radio wave strength of the neighboring base station 200-C is "−65 dB". At the spot X1, the terminal 100 is located outside the service provision range of the neighboring base station 200-B. Therefore, it is difficult for the terminal 100 to receive a wireless signal transmitted by the neighboring base station 200-B. Accordingly, the radio wave strength of the neighboring base station 200-B is "0 dB".

In this case, the radio wave strength, "−65 dB", of the neighboring base station 200-C is stronger (higher) than the radio wave strength, "−60 dB", of the source base station 200-A and is stronger (higher) than the first threshold value (for example, −40 dB or the like). Therefore, the terminal 100 judges that handing over to the neighboring base station 200-C is to be performed (YES in S22 in FIG. 7).

In addition, the radio wave strength, "−60 dB", of the source base station 200-A is greater than or equal to the second threshold value. Therefore, the terminal 100 judges that coupling to the source base station 200-A is maintainable, and the terminal 100 selects a target base station (YES in S24, and S25 to S28). In this case, if the terminal 100 utilizes VoLTE or performs packet communication based on the LTE system, the target candidate base station group is the neighboring base station 200-B whose communication type is the LTE system (S252 in FIG. 8 or S261 in FIG. 9).

On the other hand, a base station that may serve as a hand over destination is the neighboring base station 200-C, and the 3G system serving as the communication type of the relevant neighboring base station 200-C is different from the LTE system serving as the target communication type of the target candidate base station group. Therefore, the communication types do not coincide with each other (YES in S27 in FIG. 7).

Therefore, while the terminal 100 selects the target candidate base station satisfying Expression (2), the target candidate base station 200-B does not satisfy Expression (2), and no target base station satisfying Expression (2) exists (S30: NO). Accordingly, the terminal 100 changes the radio wave strength, "−65 dB", of the neighboring base station 200-C to "−20 dB" weaker (lower) than the radio wave strength, "−60 dB", of the source base station 200-A (S32 in FIG. 7).

Next, the radio wave strength table 123b after the change will be described. The radio wave strength of the base station 200-C at the spot X1 is changed from "−65 dB" to "−20 dB". The terminal 100 issues a MEASUREMENT REPORT message including the radio wave strengths ("−35 dB", "−45 dB", and "−25 dB") of the respective base stations (S32 in FIG. 7).

In this case, in the base station 200-A, Expression (3) and Expression (4) are satisfied. Therefore, the terminal 100 is caused not to perform hand over and to maintain coupling to the base station 200-A itself (S57 in FIG. 13).

Next, in a case where the terminal 100 moves to the spot Y1, the following operation is performed. As illustrated in FIG. 14, in a case the terminal 100 receives a MEASUREMENT CONTROL REQ message at the spot Y1, the terminal 100 measures the radio wave strengths of the three base stations 200-A to 200-C.

In addition, FIG. 15 includes an example of the radio wave strength table 123a measured at the spot Y1. In this case, the radio wave strength, "−70 dB", of the base station 200-C is stronger (or higher) than the radio wave strength, "−35 dB", of the source base station and is the strongest (or highest) radio wave strength among the neighboring base stations 200-B and 200-C. Therefore, the terminal 100 is handed over to the base station 200-C (YES in S22 in FIG. 7).

The terminal 100 judges that coupling to the source base station 200-A is maintainable (S24: YES), and the terminal 100 selects the LTE system as the communication type of the target candidate base station group and selects, as the target candidate base station group, the neighboring base station 200-B based on the LTE system (S252 in FIG. 8 or S261 in FIG. 9).

Since the communication type (the 3G system) of the base station 200-C does not coincide with the target communication type (the LTE system) (S27: YES), a target base station satisfying Expression (2) is selected from the target candidate base station group (the base station 200-B). In this case, it is assumed that the base station 200-B satisfies Expression (2).

In this case, the target base station exists (YES in S30 in FIG. 7). Therefore, the radio wave strength of a neighboring base station other than the base station 200-B serving as the target base station (the radio wave strength, "−70 dB", of the base station 200-C) is changed to "−25 dB" weaker (or lower) than the radio wave strength ("−45 dB") of the target base station (S31 in FIG. 7).

In this case, in the base station 200, the radio wave strength of the target base station is the strongest among the neighboring base stations and is stronger than the radio wave strength of the source base station 200. Therefore, the terminal 100 is caused to be handed over to the target base station (S56 in FIG. 13).

To sum it up, in the example of FIG. 14, the terminal 100 maintains coupling to the source base station 200-A while not being handed over to the base station 200-C at the spot X1. In addition, the terminal 100 is handed over to the base station 200-B at the spot Y1 while not being handed over to the base station 200-C. Accordingly, the terminal 100 does not change a communication type after the hand over, and it is possible for the terminal device 100 to suppress a transmission delay associated with processing for changing the communication type.

(Second Example)

Figure 16:
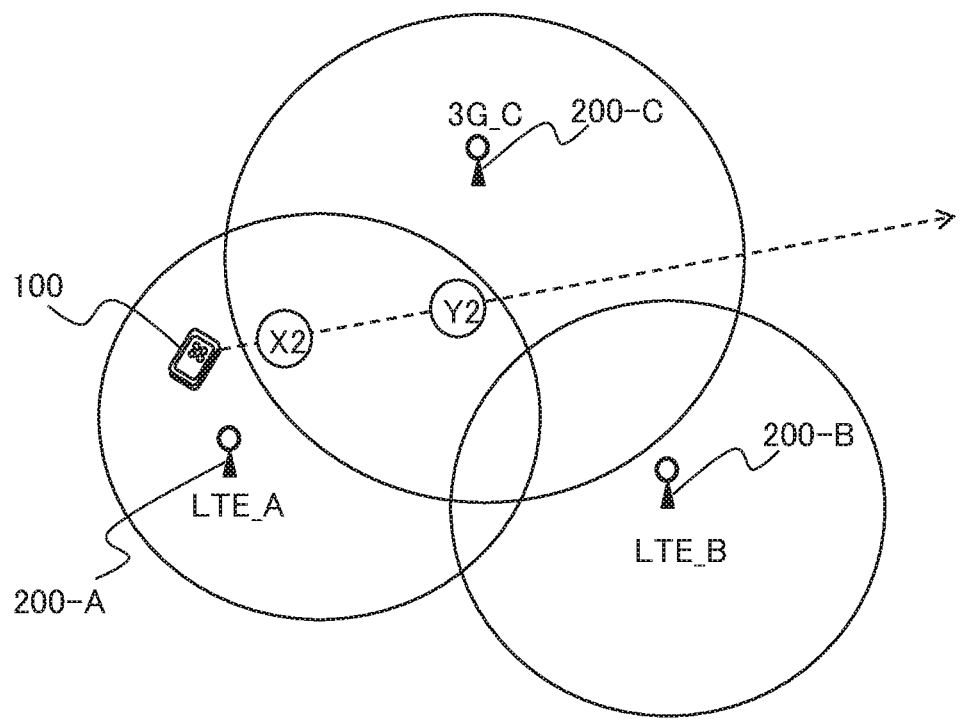
FIG. 16 is a diagram illustrating a state in which a terminal device moves in a wireless communication system.

Next, a second example will be described. FIG. 16 illustrates a state in which the terminal device 100 moves. While, in the first example, the terminal 100 moves within the service provision range of the base station 200-B, the present second example illustrates an example in which the terminal 100 moves beyond the service provision range of the base station 200-B.

Upon receiving a MEASUREMENT CONTROL REQ message at a spot X2, the terminal 100 measures the radio wave strengths of the source base station 200-A and the neighboring base station 200-C (S21 in FIG. 7).

FIG. 17 is an example of the radio wave strength table 123 and illustrates examples of the radio wave strengths of respective base stations measured at the spot X2. In this case, since the radio wave strength, "−90 dB", of the source base station 200-A is stronger (or higher) than the radio wave strength, "−20 dB", of the neighboring base station 200-C, it is determined that hand over is not to be performed (NO in S22 in FIG. 7).

The terminal 100 issues a MEASUREMENT REPORT message including the radio wave strength of the source base station 200-A and the radio wave strength of the neighboring base station 200-C (S23 in FIG. 7). In this case, in the base station 200-A, the radio wave strength, "−90 dB", of the source base station 200-A is higher than the radio wave strength, "−20 dB", of the neighboring base station 200-C, and coupling to the source base station is maintained (YES in S55, and S57 in FIG. 13).

Next, in a case where the terminal 100 moves to a spot Y2, the radio wave strengths of the source base station 200-A and the neighboring base station 200-C are measured, and the radio wave strength of the neighboring base station 200-B is not measured. FIG. 17 is an example of the radio wave strength table 123 and illustrates examples of the radio wave strengths of respective base stations measured at the spot Y2. In this case, since the radio wave strength, "−70 dB", of the source base station 200-C is stronger (or higher) than the radio wave strength, "−5 dB", of the source base station 200-A, the terminal 100 judges that handing over to the neighboring base station 200-C is to be performed (YES in S22 in FIG. 7).

In addition, since the radio wave strength, "−5 dB", of the source base station 200-A is less than or equal to the second threshold value (for example, −20 dB or the like), the terminal 100 judges that it is difficult to maintain coupling to the source base station 200-A (S24: NO).

In this case, the terminal 100 issues a MEASUREMENT REPORT message including the radio wave strengths of the source base station 200-A and the neighboring base station 200-C (S23 in FIG. 7). In the base station 200, the radio wave strength of the neighboring base station 200-C is stronger than the radio wave strength of the source base station 200-A (NO in S55 in FIG. 13). Therefore, the terminal 100 is caused to be handed over to the neighboring base station 200-C (S56).

To sum it up, in the second example, the terminal 100 maintains coupling to the source base station 200-A at the spot X2 and is handed over to the neighboring base station 200-C at the spot Y2. In this case, if being handed over to the neighboring base station 200-C, the terminal 100 performs processing for switching a communication type from the LTE system to the 3G system.

As above, the second embodiment is described. In this way, in the present second embodiment, an example is described in which the terminal 100 sets the radio wave strengths of neighboring base stations other than the target base station to values weaker than the radio wave strength of the target base station (S31 in FIG. 7) or sets the radio wave strengths of neighboring base stations to values weaker than the radio wave strength of the source base station 200 (S32 in FIG. 7).

Since setting the radio wave strengths of neighboring base stations to values weaker than the radio wave strength of the source base station 200 at, for example, the spot X1 (for example, FIG. 14), the terminal 100 maintains coupling to the source base station 200-A while not being handed over to the base station 200-C.

In addition, since the radio wave strengths of neighboring base stations other than the target base station are set to values weaker than the radio wave strength of the target base station at, for example, the spot Y1 (for example, FIG. 14), it is possible for the terminal 100 to be handed over to the base station 200-B without being handed over to the base station 200-C.

Accordingly, the terminal 100 is not handed over to the neighboring base station 200-C whose communication type is different from that of the source base station 100-A, and it is possible for the terminal 100 to be handed over to the neighboring base station 100-B whose communication type is the same as that of the source base station 100-A.

Therefore, the terminal 100 does not perform processing for changing a communication type at the time of hand over, and it is possible for the terminal device 100 to suppress a transmission delay associated with the processing for changing the communication type.

In addition, in the usual hand over process, at the spot X1 in FIG. 14, the radio wave strength, "−65 dB", of the neighboring base station 200-C is stronger than the radio wave strength, "−60 dB", of the source base station 200-A, and the terminal 100 is handed over to the base station 200-C in some cases.

However, in the present second embodiment, hand over is not performed at the spot X1, and coupling to the source base station 200-A is maintained. Accordingly, compared with the usual hand over process, in the present second embodiment, it is possible to achieve the reduction of the number of times hand over is performed. If the number of times hand over is performed is reduced in the terminal 100, processing operations associated with the hand over are reduced, and it is possible to achieve the reduction of power consumption of the terminal 100.

(Another Example)

In the above-mentioned second embodiment, an example is described in which the radio wave strengths of neighboring base stations other than the target base station are set to values weaker than the radio wave strength of the target base station (S31 in FIG. 7) or the radio wave strengths of neighboring base stations are set to values weaker than the radio wave strength of the source base station 200 (S32 in FIG. 7).

Instead of, for example, setting the radio wave strengths of all neighboring base stations other than the target base station to values weaker than the radio wave strength of the target base station (S31 in FIG. 7), the radio wave strength of the target base station may be set to the strongest value among the radio wave strengths of the neighboring base stations. The radio wave strength of the target base station becomes stronger than the radio wave strengths of other base stations. Therefore, in the same way as in the above-mentioned second embodiment, it is possible for the terminal 100 to be handed over to the target base station while not changing a communication type.

In addition, instead of setting the radio wave strengths of all the neighboring base stations to values weaker than the radio wave strength of the source base station 200 (S32 in FIG. 7), the radio wave strength of the source base station 200 may be set to a value stronger than the radio wave strengths of the neighboring base stations. The radio wave strength of the source base station 200 becomes a value stronger than the radio wave strengths of all the neighboring base stations. Therefore, it is possible for the terminal 100 to maintain coupling to the source base station 200.

In other words, the terminal 100 may change the radio wave strength of the target base station or the neighboring base stations or the radio wave strength of the source base station 200. From this, it is possible to be handed over to the target base station while not changing, for example, a communication type. Accordingly, it is possible for the terminal device 100 to avoid a transmission delay associated with changing of a communication type. In addition, in some case, the terminal 100 maintains coupling to the source base station 200 while not being handed over to a neighboring base station. Therefore, the number of times hand over is performed is reduced, and it is possible to reduce the power consumption of the terminal 100.

In the above mentioned second embodiment, an example in which the terminal 100 measures the radio wave strengths of the respective base stations 200 and changes a radio wave strength is described. In place of a radio wave strength, a quality indicator such as a signal to noise ratio (SNR) obtained by subtracting a noise strength from the radio wave strength or a carrier to interference noise ratio (CINR) may be used.

(Another Embodiment)

Figure 18A:
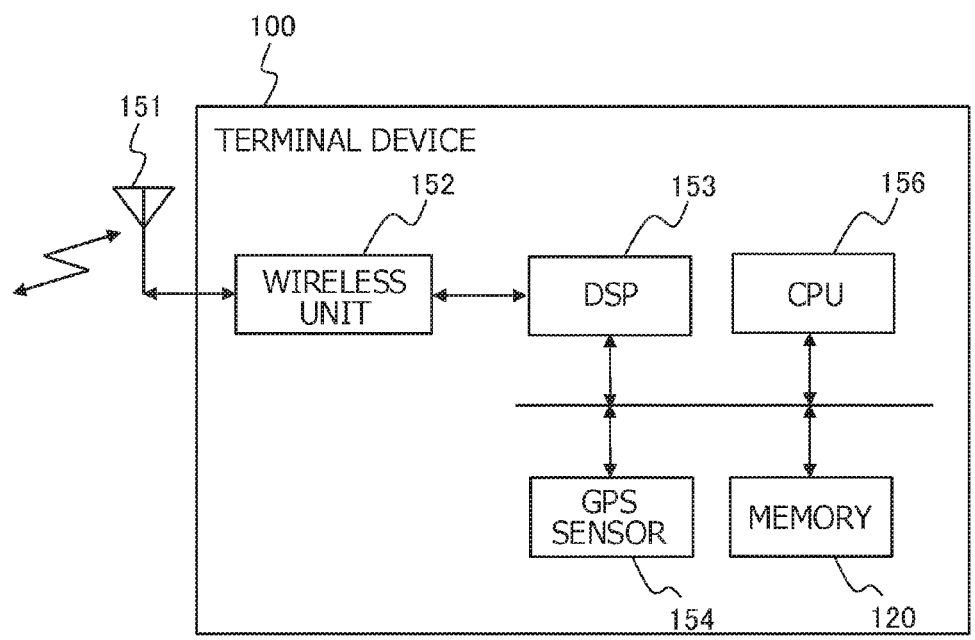
FIG. 18A is a diagram illustrating an example of a hardware configuration of a terminal device.
Figure 18B:
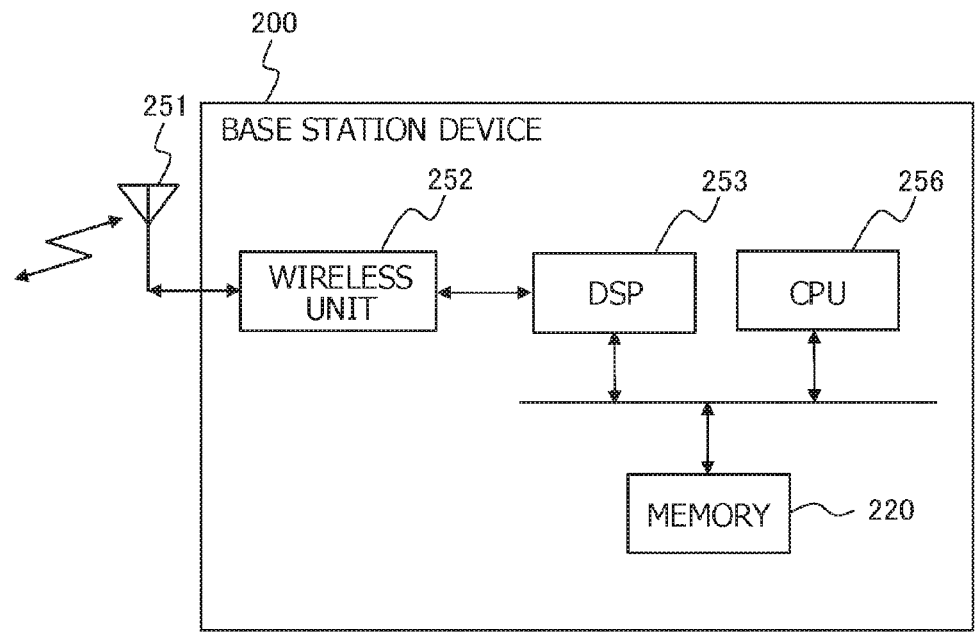
FIG. 18B is a diagram illustrating an example of a hardware configuration of a base station device.

Next, another embodiment will be described. FIG. 18A illustrates an example of a hardware configuration of the terminal device 100, and FIG. 18B illustrates an example of a hardware configuration of the base station device 200.

The terminal 100 further includes an antenna 151, a wireless unit 152, a digital signal processor (DSP) 153, a GPS sensor 154, and a central processing unit (CPU) 156.

The wireless unit 152 subjects a wireless signal, received by the antenna 151, to frequency conversion processing, demodulation processing, and so forth and outputs, to the DSP 153, a demodulated reception signal. In addition, the wireless unit 152 subjects an output signal, output by the DSP 153, to modulation processing, frequency conversion processing, and so forth, thereby converting the output signal to a wireless signal, and outputs the converted wireless signal to the antenna 151. The wireless unit 152 and the antenna 151 correspond to, for example, the reception unit 101 and the transmission unit 104 in the second embodiment.

The DSP 153 subjects the reception signal, output by the wireless unit 152, to error correction decoding processing and so forth and extracts an RRC message and so forth, transmitted by the base station 200. The DSP 153 outputs the extracted RRC message and so forth to the CPU 156. In addition, the DSP 153 subjects the extracted RRC message and so forth, output by the CPU 156, to error correction coding processing and so forth and outputs, as an output signal, the RRC message and so forth to the wireless unit 152. The DSP 153 corresponds to, for example, the reception unit 101 and the transmission unit 104 in the second embodiment.

Using a GPS method, the GPS sensor 154 detects the location of the terminal 100. The GPS sensor 154 corresponds to, for example, the positioning functional unit 105 in the second embodiment.

For example, the CPU 156 controls individual units in the terminal 100, analyzes and generates RRC messages, and selects a target base station (for example, FIG. 7). The CPU 156 corresponds to, for example, the RRC analysis unit 102, the RRC generation unit 103, the MR generation unit 106, the radio wave measurement unit 107, and the control unit 110 in the second embodiment.

The base station 200 further includes an antenna 251, a wireless unit 252, a DSP 253, and a CPU 256. The antenna 251 and the wireless unit 252 correspond to, for example, the reception unit 201 and the transmission unit 204 in the second embodiment. In addition, the DSP 253 corresponds to, for example, the reception unit 201 and the transmission unit 204 in the second embodiment. Furthermore, the CPU 256 corresponds to, for example, the RRC analysis unit 202, the RRC generation unit 203, and the control unit 210 in the second embodiment.

Each of the DSP 153 in the terminal 100 and the DSP 253 in the base station 200 may be a controller such as a field programmable gate array (FPGA) or a CPU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   a memory; and
   a processor coupled to the memory and configured to
   calculate a first radio wave strength value, based on a first radio wave between the wireless communication device and a first base station device wirelessly coupled to the wireless communication device,
   calculate a second radio wave strength value, based on a second radio wave between the wireless communication device and a second base station device,
   execute an adjusting process that adjusts at least one of the first radio wave strength value and the second radio wave strength value, when a first wireless communication method used by the first base station device is different from a second wireless communication method used by the second base station device, and
   transmit, to the first base station device, a measurement report that is generated based on the first radio wave strength value and the second radio wave strength value, at least one of the first radio wave strength value and the second radio wave strength value that is used for generating the measurement report being an adjusted value that is adjusted in the adjusting process.

2. The wireless communication device according to claim 1, wherein
   a judgement whether a hand over process is to be performed from the first base station device to the second base station device is performed, by comparing the first radio wave strength value and the second radio wave strength value after the adjusting process has been executed.

3. The wireless communication device according to claim 2, wherein the processor is configured to
   adjust, when the second wireless communication method is equal to the first wireless communication method, at least one of the first radio wave strength value and the second radio wave strength value so that the first radio wave strength value becomes less than the second radio wave strength value.

4. The wireless communication device according to claim 2, wherein the processor is configured to
   execute the adjusting process by adjusting at least one of the first radio wave strength value and the second radio wave strength value so that the first radio wave strength value becomes greater than the second radio wave strength value.

5. The wireless communication device according to claim 2, wherein the processor is configured to
   identify a third radio wave strength value, based on a third radio wave between the wireless communication device and a third base station device,
   adjust, when the second wireless communication method is equal to the first wireless communication method and a third wireless communication method used by the third base station device is different from the first wireless communication method, a value of at least one of the first radio wave strength value, the second radio wave strength value, and the third radio wave strength value so that the third radio wave strength value becomes less than the second radio wave strength value, and adjust, when the second wireless communication method and the third wireless communication method are different from the first wireless communication method, a value of at least one of the first radio wave strength value, the second radio wave strength value, and the third radio wave strength value so that the second radio wave strength value and the third radio wave strength value become less than the first radio wave strength value.

6. The wireless communication device according to claim 5, wherein the processor is configured to adjust, when the second wireless communication method is equal to the first wireless communication method and the second base station device is selected, as a candidate base station to serve as a hand over destination, based on an indicator obtained based on an angle formed between a first direction in which the wireless communication device moves and a second direction from the wireless communication device toward the second base station device, at least one of the third radio wave strength value and the second radio wave strength value so that the third radio wave strength value becomes less than the second radio wave strength value.

7. The wireless communication device according to claim 6, wherein the indicator is a value obtained by multiplying the angle by a coefficient that varies in accordance with a distance between the wireless communication device and the second base station device.

8. The wireless communication device according to claim 7, wherein the processor is configured to select, when the indicator is less than a threshold value, the second base station device as a candidate base station to serve as a hand over destination.

9. The wireless communication device according to claim 6, wherein the processor is configured to select the candidate base station to serve as the hand over destination, based on the first wireless communication method used in wireless communication between the wireless communication device and the first base station device.

10. A wireless communication system comprising:
a first base station device;
a second base station device; and
a wireless communication device, wherein
the first base station device is wirelessly coupled to the wireless communication device, and
the wireless communication device includes
a memory, and
a processor coupled to the memory and configured to
calculate a first radio wave strength value, based on a first radio wave between the wireless communication device and the first base station device wirelessly coupled to the wireless communication device,
calculate a second radio wave strength value, based on a second radio wave between the wireless communication device and the second base station device,
execute an adjusting process that adjusts at least one of the first radio wave strength value and the second radio wave strength value, when a first wireless communication method used by the first base station device is different from a second wireless communication method used by the second base station device, and
transmit, to the first base station device, a measurement report that is generated based on the first radio wave strength value and the second radio wave strength value, at least one of the first radio wave strength value and the second radio wave strength value that is used for generating the measurement report being an adjusted value that is adjusted in the adjusting process.

11. The wireless communication system according to claim 10, wherein the first base station device judges whether a hand over process is to be performed from the first base station device to the second base station device is performed, by comparing the first radio wave strength value and the second radio wave strength value after the adjusting process has been executed.

12. The wireless communication system according to claim 11, wherein the processor is configured to adjust, when the second wireless communication method is equal to the first wireless communication method, at least one of the first radio wave strength value and the second radio wave strength value so that the first radio wave strength value becomes less than the second radio wave strength value.

13. The wireless communication system according to claim 11, wherein the processor is configured to execute the adjusting process by adjusting at least one of the first radio wave strength value and the second radio wave strength value so that the first radio wave strength value becomes greater than the second radio wave strength value.

14. The wireless communication system according to claim 11, further comprising:
a third base station device, wherein
the processor is configured to
identify a third radio wave strength value, based on a third radio wave between the wireless communication device and the third base station device,
adjust, when the second wireless communication method is equal to the first wireless communication method and a third wireless communication method used by the third base station device is different from the first wireless communication method, a value of at least one of the first radio wave strength value, the second radio wave strength value, and the third radio wave strength value so that the third radio wave strength value becomes less than the second radio wave strength value, and
adjust, when the second wireless communication method and the third wireless communication method are different from the first wireless communication method, a value of at least one of the first radio wave strength value, the second radio wave strength value, and the third radio wave strength value so that the second radio wave strength value and the third radio wave strength value become less than the first radio wave strength value.

15. The wireless communication system according to claim 14, wherein the processor is configured to adjust, when the second wireless communication method is equal to the first wireless communication method and the second base station device is selected, as a candidate base station to serve as a hand over destination, based on an indicator obtained based on an angle formed between a first direction in which the wireless communication device moves and a second direction from the wireless communication device toward the second base station device, at least one of the third radio wave strength value and the second radio wave strength value so that the third radio wave strength value becomes less than the second radio wave strength value.

16. The wireless communication system according to claim 15, wherein the indicator is a value obtained by multiplying the angle by a coefficient that varies in accordance with a distance between the wireless communication device and the second base station device.

17. The wireless communication system according to claim 16, wherein the processor is configured to select, when the indicator is less than a threshold value, the second base station device as a candidate base station to serve as a hand over destination.

18. A hand over control method that utilizes a wireless communication system including a first base station device, a second base station device, and a wireless communication device, the hand over control method comprising:

calculating a first radio wave strength value, based on a first radio wave between the wireless communication device and the first base station device wirelessly coupled to the wireless communication device;

calculating a second radio wave strength value, based on a second radio wave between the wireless communication device and the second base station device;

executing an adjusting process that adjusts at least one of the first radio wave strength value and the second radio wave strength value, when a first wireless communication method used by the first base station device is different from a second wireless communication method used by the second base station device; and transmitting, to the first base station device, a measurement report that is generated based on the first radio wave strength value and the second radio wave strength value, at least one of the first radio wave strength value and the second radio wave strength value that is used for generating the measurement report being an adjusted value that is adjusted in the adjusting process.

19. The hand over control method according to claim 18, further comprising:

judging whether a hand over process is to be performed from the first base station device to the second base station device is performed, by comparing the first radio wave strength value and the second radio wave strength value after the adjusting process has been executed.

20. The hand over control method according to claim 19, further comprising:

adjusting, when the second wireless communication method is equal to the first wireless communication method, at least one of the first radio wave strength value and the second radio wave strength value so that the first radio wave strength value becomes less than the second radio wave strength value.

* * * * *